(12) United States Patent
Yamane

(10) Patent No.: US 9,329,828 B2
(45) Date of Patent: May 3, 2016

(54) INFORMATION PROCESSING APPARATUS FOR DISPLAYING ADJACENT PARTIAL IMAGES OUT OF A PLURALITY OF PARTIAL IMAGES THAT CONSTITUTE ONE IMAGE ON DISPLAY UNITS OF A PLURALITY OF ADJACENT INFORMATION PROCESSING APPARATUSES

(71) Applicant: CANON KABUSHIKI KAISHA, Tokyo (JP)

(72) Inventor: Toshimizu Yamane, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 101 days.

(21) Appl. No.: 14/076,490

(22) Filed: Nov. 11, 2013

(65) Prior Publication Data

US 2014/0132482 A1 May 15, 2014

(30) Foreign Application Priority Data

Nov. 13, 2012 (JP) ................................. 2012-249284

(51) Int. Cl.
*G09G 5/12* (2006.01)
*G06F 3/14* (2006.01)
*G06F 3/0487* (2013.01)

(52) U.S. Cl.
CPC ............ *G06F 3/1446* (2013.01); *G06F 3/0487* (2013.01); *G09G 2354/00* (2013.01); *G09G 2356/00* (2013.01)

(58) Field of Classification Search
None
See application file for complete search history.

(56) References Cited

U.S. PATENT DOCUMENTS

2011/0285658 A1* 11/2011 Homma et al. ............... 345/173
2012/0038781 A1* 2/2012 Im et al. ...................... 348/207.1
2012/0088485 A1* 4/2012 Yamashita et al. ............ 455/418

FOREIGN PATENT DOCUMENTS

JP 11-134087 A 5/1999
JP 2010-266752 A 11/2010

* cited by examiner

*Primary Examiner* — Nicholas Lee
*Assistant Examiner* — Duane N Taylor, Jr.
(74) *Attorney, Agent, or Firm* — Canon USA Inc. IP Division

(57) ABSTRACT

An information processing apparatus displays, in cooperation with a display unit of another apparatus adjacent to the information processing apparatus, adjacent partial images out of a plurality of partial images that constitute one image. The information processing apparatus includes a detection unit configured to detect information about movement of the information processing apparatus, an identification unit configured to identify a site of the information processing apparatus that adjoins the another apparatus based on the information about movement which has been detected by the detection unit, and a display control unit to cause a display unit of the information processing apparatus to display a partial image that is identified based on the site identified by the identification unit out of the plurality of partial images that constitute the one image.

15 Claims, 24 Drawing Sheets

INFORMATION PROCESSING APPARATUS FOR DISPLAYING ADJACENT PARTIAL IMAGES OUT OF A PLURALITY OF PARTIAL IMAGES THAT CONSTITUTE ONE IMAGE ON DISPLAY UNITS OF A PLURALITY OF ADJACENT INFORMATION PROCESSING APPARATUSES

BACKGROUND OF THE INVENTION

1. Field of the Invention

The present disclosure generally relates to information processing and, more particularly, to a display technology in which a plurality of information processing apparatuses each having a communication mechanism and a display unit are used to display an image.

2. Description of the Related Art

Tablet personal computers (PCs) are rapidly gaining popularity for their handiness. Even conference systems that use tablet PCs have recently been proposed. Such conference systems help in going paperless. Most tablet PCs have a display screen sized around 10 inches, and therefore are not suitable for displaying a complicated blueprint, a map, or other similar images where checking the overall image and detailed partial images simultaneously is desired. As a solution, a technology of treating a plurality of information processing apparatuses as one information processing apparatus to display pieces of a large image on the plurality of information processing apparatuses in a distributed manner.

Japanese Patent Application Laid-Open No. 11-134087 discloses a display system in which a plurality of devices each having a display unit are arranged so as to be capable of providing a large screen as a whole. This display system accomplishes large-screen display as a whole by combining a plurality of display units. Specifically, one device keeps track of the positions of all devices and controls image display of each device.

Japanese Patent Application Laid-Open No. 2010-266752 discloses a display device that has a foldable display unit. This display device has an acceleration sensor and switches the direction and display size of an image in a folded mode and a large-screen mode, depending on the result of detection by the acceleration sensor.

When displaying one image with display units of a plurality of tablet PCs, it is crucial to precisely determine for each tablet PC which part of the whole image is displayed by the display unit of the tablet PC. Unless this determination is made precisely, correct display of the whole image with a plurality of display units cannot be achieved. It is therefore necessary to know the accurate position of each tablet PC in the entire screen by detecting for each tablet PC in which part the tablet PC is coupled to another tablet PC.

In Japanese Patent Application Laid-Open No. 11-134087, a special sensor for detecting the physical contact state of each device is required for determining which of the plurality of devices displays which part of the whole image. A high-precision position sensor is also needed in order to detect the positions of the devices relative to one another. Neither sensor is mounted to tablet PCs that are commonly available at present. If the sensors were to be mounted to a tablet PC, the tablet PC would be expensive.

Japanese Patent Application Laid-Open No. 2010-266752 deals with a foldable and large-screen information processing apparatus in which each display unit constituting a large screen is assigned in advance a part of the whole image to display. Accordingly, this cannot be applied to a case where a plurality of tablet PCs are used to constitute one information processing apparatus.

SUMMARY OF THE INVENTION

In order to solve the above-mentioned problem, according to an exemplary embodiment of the present disclosure, there is provided an information processing apparatus for displaying, in cooperation with a display unit of another apparatus adjacent to the information processing apparatus, adjacent partial images out of a plurality of partial images that constitute one image. The information processing apparatus includes a detection unit configured to detect information about movement of the information processing apparatus, an identification unit configured to identify a site of the information processing apparatus that adjoins the another apparatus based on the information about movement which has been detected by the detection unit, and a display control unit to cause a display unit of the information processing apparatus to display a partial image that is identified based on the site identified by the identification unit out of the plurality of partial images that constitute the one image.

Further features of the present disclosure will become apparent from the following description of exemplary embodiments (with reference to the attached drawings).

DESCRIPTION OF THE EMBODIMENTS

Figure 1:
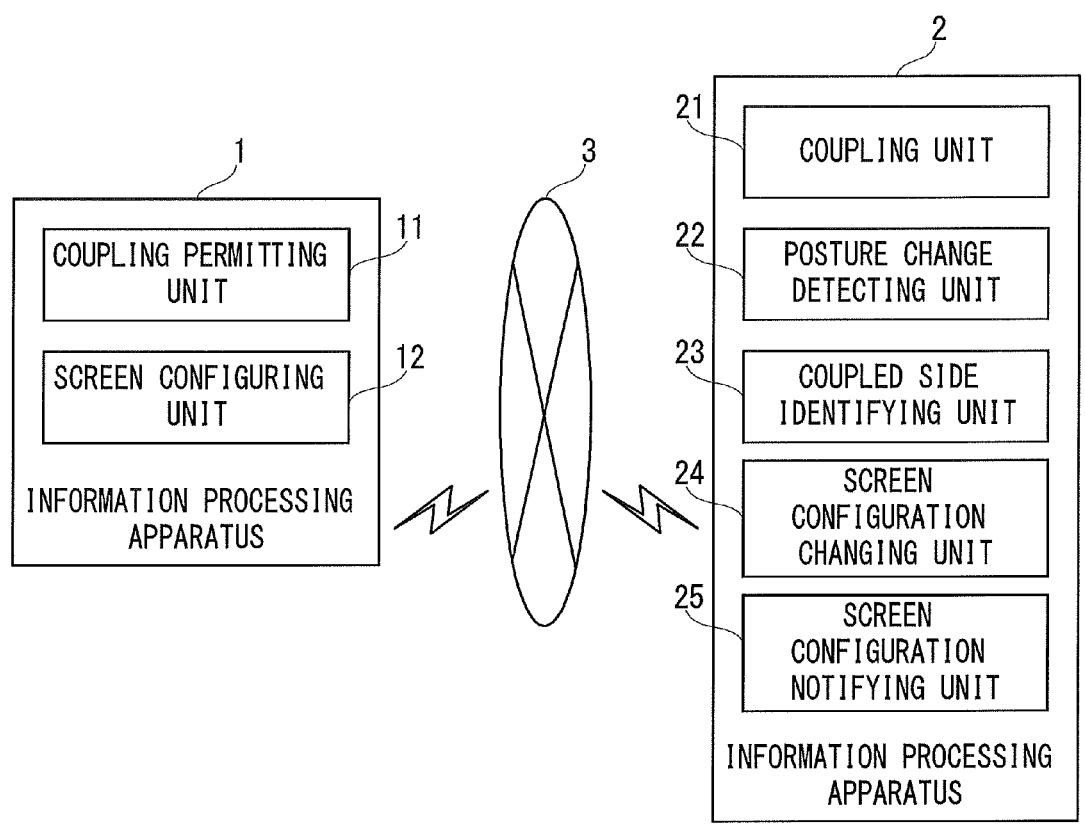
FIG. 1 is an overall configuration diagram of an image display system according to a first embodiment.

Various exemplary embodiments, features, and aspects of the present disclosure are described below in detail with reference to the drawings.
First Embodiment FIG. 1 is an overall configuration diagram of an image display system according to a first embodiment.

This image display system is built by connecting a plurality of information processing apparatuses in a manner that allows data transmission/reception over a network 3. In the image display system of FIG. 1, two information processing apparatus, which are respectively denoted by 1 and 2, are connected to the network 3. The information processing apparatus 1 and the information processing apparatus 2 can be tablet PCs that have a communication function.

The image display system "couples" the information processing apparatus 1 and the information processing apparatus 2 in order to use the information processing apparatus 1 and the information processing apparatus 2 as one information processing apparatus. The term "couple" as used herein refers to putting the information processing apparatus in a state where the information processing apparatus 1 and the information processing apparatus 2 are capable of separately displaying a plurality of partial images which are created by dividing one image, thereby functioning as though the two are one information processing apparatus.

Function blocks for coupling are respectively formed in the information processing apparatus 1 and the information processing apparatus 2. Coupling modes include one in which the information processing apparatus 1 is coupled to the information processing apparatus 2, and one in which the information processing apparatus 2 is coupled to the information processing apparatus 1. Forming all of function blocks that are illustrated in FIG. 1 in each of the information processing apparatus 1 and the information processing apparatus 2 is therefore desirable, but is not always necessary. This embodiment describes the mode in which the information processing apparatus 2 is coupled to the information processing apparatus 1, for conveniences' sake. In other words, function blocks necessary for being coupled are formed in the information processing apparatus 1, whereas function blocks necessary for coupling to are formed in the information processing apparatus 2.

The information processing apparatus 1 and the information processing apparatus 2 can be implemented by the same hardware configuration. Therefore, the hardware configuration of the information processing apparatus 1 alone is described and a description on the hardware configuration of the information processing apparatus 2 is omitted. An example of the hardware configuration of the information processing apparatus 1 is illustrated in FIG. 2.

Figure 2:
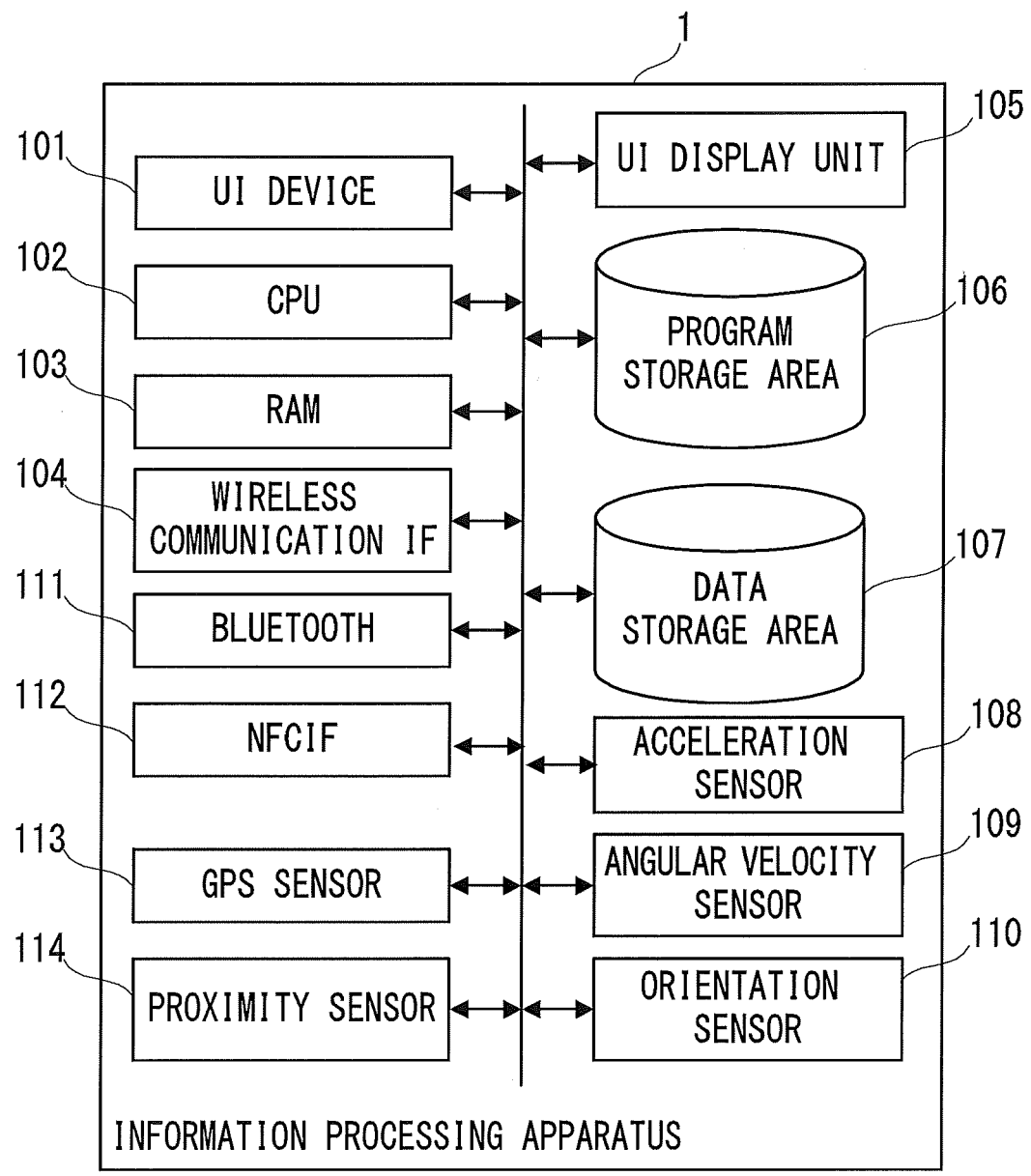
FIG. 2 is a hardware configuration diagram of an information processing apparatus.

In FIG. 2, a user interface (UI) device 101 is a touch panel, a digitizer, or the like. The UI device 101 enables a user of the information processing apparatus 1 to input various instructions to the information processing apparatus 1.

A central processing unit (CPU) 102 reads a computer program out of a program storage area 106 to perform various types of control, calculation, display control, and the like of the information processing apparatus 1. A random access memory (RAM) 103 is used as a work area when the CPU 102 executes processing. As used herein, the term "unit" generally refers to any combination of software, firmware, hardware, or other component that is used to effectuate a purpose.

A wireless communication interface (IF) 104 is connected to the network 3 to control communication to/from other information processing apparatus on the network 3 such as the information processing apparatus 2, and communication to/from various servers.

A UI display unit 105 is a display for displaying an image such as a light emitting diode (LED) panel or a liquid crystal panel, and displays the state of the information processing apparatus 1 and the specifics of processing.

A data storage area 107 stores, among others, data that is used when the CPU 102 executes a program, and contents data such as music data and image data. In this embodiment, in particular, the data storage area 107 serves as a whole image keeping area for keeping a whole image, pieces of which are displayed on the display units of the information processing apparatus 1 and 2 in a distributed manner. The program storage area 106 and the data storage area 107 are implemented by, for example, a large-capacity storage device such as a hard disk or a flash memory.

In addition to this, the information processing apparatus 1 includes a BLUETOOTH (trademark) interface 111 and a near field communication (NFC) interface 112 as short-distance wireless communication instruments. These short-distance wireless communication instruments enable the information processing apparatus 1 to hold direct communication to/from the information processing apparatus 2 without the intervention of the network 3. The short-distance wireless communication instruments and the wireless communication interface 104 constitute a communication module.

The information processing apparatus 1 also includes a Global Positioning System (GPS) sensor 113, a proximity sensor 114, an acceleration sensor 108, an angular velocity sensor 109, an azimuth orientation sensor 110, and other various sensors that are mounted to conventional tablet PCs. With these sensors, the position, posture, behavior, and the like of the information processing apparatus 1 can be detected.

In the following description, hardware of the information processing apparatus 2 is denoted by reference numerals that are created by replacing the hundreds-digit figure of reference numerals for hardware of the information processing apparatus 1 with "2". For instance, a CPU of the information processing apparatus 2 is referred to as CPU 202.

The thus configured information processing apparatus 1 forms a coupling permitting unit 11 and a screen configuring unit 12 which are illustrated in FIG. 1 by executing a program with the CPU 102.

The coupling permitting unit 11 informs surrounding information processing apparatus of the fact that the information processing apparatus 1 is ready for coupling with other information processing apparatus. To that end, the coupling permitting unit 11 transmits coupling permission information which indicates readiness for coupling with other information processing apparatus to the outside via the wireless communication interface 104 or the short-distance wireless communication instruments. The coupling permission information includes identification information for identifying its own apparatus (the information processing apparatus 1) such as an internet protocol (IP) address. The coupling permission information also includes size information which indicates the shape and size of the display unit of its own apparatus.

The screen configuring unit 12 receives, via the wireless communication interface 104 or one of the short-distance wireless communication instruments, screen change information which indicates the specifics of a change in screen configuration from another information processing apparatus coupled to its own apparatus, and then switches screen display to one that is based on the received information.

Similarly, the information processing apparatus 2 forms a coupling unit 21, a posture change detecting unit 22, a coupled side identifying unit 23, a screen configuration changing unit 24, and a screen configuration notifying unit 25 which are illustrated in FIG. 1 by executing a program with the CPU 202.

The coupling unit 21 detects an information processing apparatus that is outputting coupling permission information and couples its own apparatus to the detected information processing apparatus. In the case where the coupling permission information is received by a wireless communication interface 204, the coupling unit 21 can couple its own apparatus to another information processing apparatus that is connected to the same access point. In the case where the coupling permission information is received by a short-distance wireless communication instrument, the coupling unit 21 measures the radio field intensity thereof, and can couple its own apparatus to an information processing apparatus that is emitting radio waves higher in intensity than a given level.

The posture change detecting unit 22 generates posture change information, which indicates the behavior of the information processing apparatus 2 such as whether a change in posture has occurred or not, the amount of the change, and the direction of the change, from acceleration and angular velocity acting on an installation site of the information processing apparatus 2 which are measured by an acceleration sensor 208 and an angular velocity sensor 209.

The coupled side identifying unit 23 identifies, from the posture change information, a coupled site where the information processing apparatus 2 and the information processing apparatus 1 are coupled. Tablet PCs and other similar information processing apparatus are usually rectangular, and the coupled side identifying unit 23 identifies which one of the top, bottom, left, and right sides, four sides in total, of the information processing apparatus 2 is in contact with the information processing apparatus 1. Herein, a side that is coupled is referred to as "coupled side".

The screen configuration changing unit 24 identifies the position of the information processing apparatus 2 relative to the information processing apparatus 1 based on the coupled side, and changes the screen configuration in a manner that suits the relative position. For instance, when the information processing apparatus 1 and the information processing apparatus 2 are coupled with the former positioned on the left side and the latter positioned on the right side, the screen configuration is changed so that a partial image that is the left-side of the whole image is displayed on the information processing apparatus 1 whereas a partial image that is the right side of the whole image is displayed on the information processing apparatus 2.

The screen configuration notifying unit 25 uses the interface by which the coupling permission information has been received to notify screen change information, which indicates the specifics of a screen configuration change made by the screen configuration changing unit 24, to the coupled information processing apparatus (the information processing apparatus 1). The screen change information instructs to change the screen configuration so that, in the example given above, the left-side partial image is displayed on the information processing apparatus 1.

The screen configuration changing unit 24 and the screen configuration notifying unit 25 manage images in this manner.

The present disclosure can be carried out also by an information processing apparatus that implements the function units described above with hardware.

Processing of coupling the information processing apparatus 2 to the thus configured information processing apparatus 1 is described with reference to the explanatory diagram of FIGS. 3A to 3C and the processing procedure diagram of FIG. 4. Here, the information processing apparatuses are coupled by bringing the information processing apparatus 2 which is a movable information processing apparatus close to the information processing apparatus 1 which is a stationary information processing apparatus lying still horizontally on a desktop or the like.

Figure 3A:
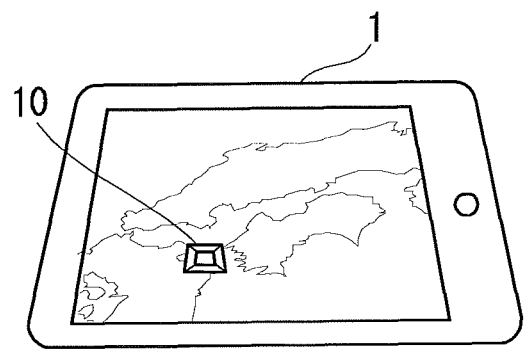
FIGS. 3A, 3B, and 3C are explanatory diagrams of coupling processing.
Figure 4:
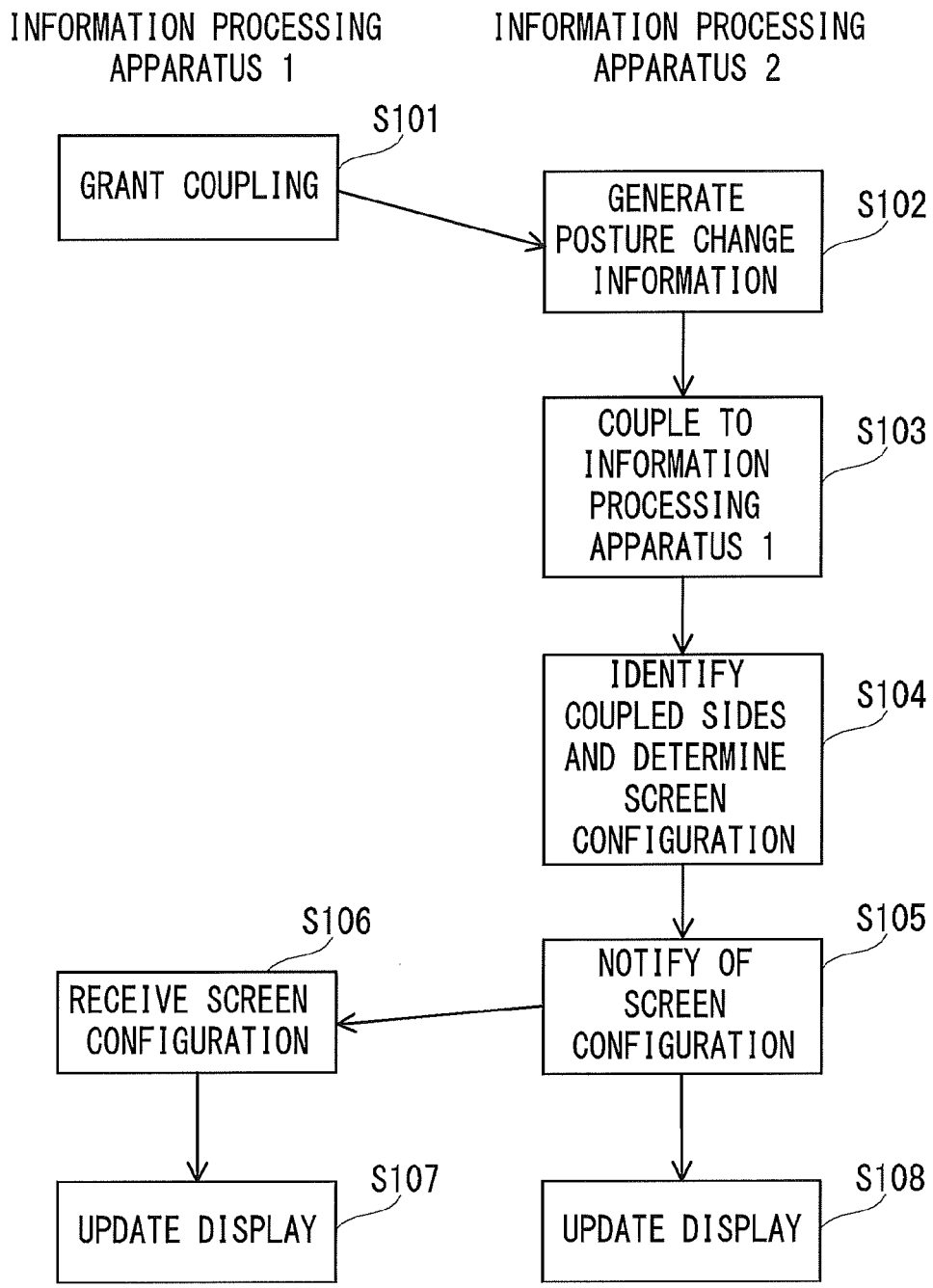
FIG. 4 is a processing procedure diagram of the coupling processing.

As illustrated in FIG. 3A, the information processing apparatus 1 displays a permission button 10 for permitting coupling. The user of the information processing apparatus 1 operates the permission button 10 when permitting coupling. Detecting that the permission button 10 has been operated, the coupling permitting unit 11 of the information processing apparatus 1 puts out coupling permission information (S101).

Other than operating the permission button 10, permission for coupling may be given by operating a physical button, tapping on the display surface, or performing long press or other types of operation in the case where the information processing apparatus 1 is a tablet PC. Alternatively, the information processing apparatus 1 may be ready for coupling all the time and constantly put out coupling permission information.

Figure 3B:
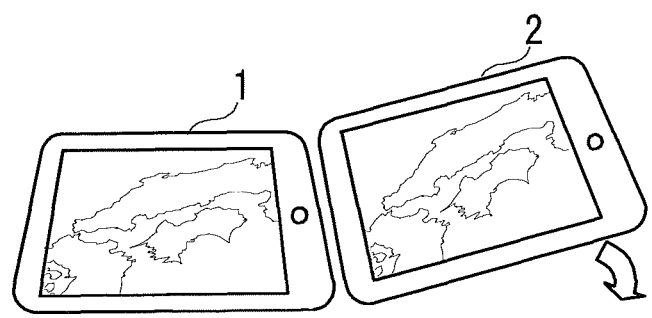

As illustrated in FIG. 3B, a user of the information processing apparatus 2 brings one side of the information processing apparatus 2 close to the information processing apparatus 1 while tilting the information processing apparatus 2 so that a display surface of the information processing apparatus 2 is at a given angle with respect to the display surface of the information processing apparatus 1. The display surface of the information processing apparatus 2 is then put horizontally so as to be on the same plane as the display surface of the information processing apparatus 1. At this point, the posture change detecting unit 22 of the information processing apparatus 2 generates posture change information from detection results of the acceleration sensor 208 and the angular velocity sensor 209 (S102).

In this state, the coupling unit 21 of the information processing apparatus 2 searches for the information processing apparatus 1 that puts out coupling permission information, and performs coupling (S103). The information processing apparatus 2 divides the whole image on the condition that coupling permission information has been put out. In the case where coupling permission information is received by the wireless communication interface 204, the coupling unit 21 first identifies, as proximate information processing apparatus, other information processing apparatus that access the same access point. Out of the proximate information processing apparatus, an information processing apparatus that puts out coupling permission information is treated as a coupling candidate.

In the case where coupling permission information is received by a short-distance wireless communication instrument, the coupling unit 21 sets an information processing apparatus that has a radio field intensity higher than a given value as a coupling candidate. The coupling unit 21 can identify a coupling candidate by checking information processing apparatus identification information that is included in the coupling permission information.

Figure 5:
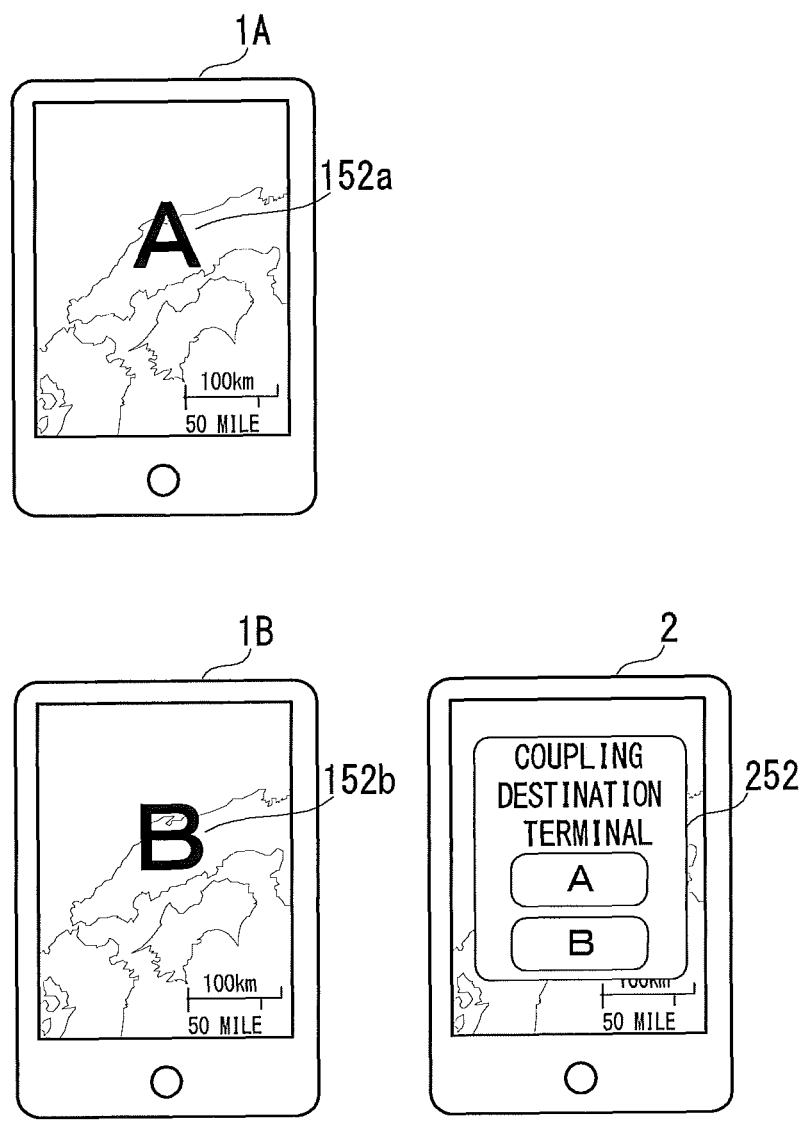
FIG. 5 is a diagram exemplifying what is displayed on an information processing apparatus 2 when there are a plurality of coupling candidates.

When there is one coupling candidate, the coupling candidate is determined as a coupling destination information processing apparatus. When there are a plurality of coupling candidates, the coupling candidates are displayed on the display unit of the information processing apparatus 2 as illustrated in FIG. 5, for example, so that the user can choose from. The display unit of the information processing apparatus 2 in FIG. 5 displays a selection screen 252 in which two information processing apparatuses, 1A and 1B, are coupling candidates. The user selects an information processing apparatus on the selection screen 252. Once the coupling destination information processing apparatus is determined, the coupling unit 21 stores in a RAM 203 identification information and size information that are included in the coupling permission information.

The coupling unit 21 may use a GPS sensor 213 to identify proximate information processing apparatus. The GPS sensor 213 in this case is desirably an indoor-use GPS sensor such as Indoor Messaging System (IMES). The coupling unit 21 uses the GPS sensor 213 to find out the positions of the respective information processing apparatus, and sets information processing apparatus that are located close to the information processing apparatus 2 as proximate information processing apparatus.

In the case where the information processing apparatus 2 is an information processing apparatus connected to a conference system, the coupling unit 21 may identify information processing apparatus that are connected to the same conference system as proximate information processing apparatus. Out of the thus identified proximate information processing apparatus, too, the information processing apparatus 2 can identify an information processing apparatus to couple to in the manner described above.

Coupling may be granted only when the direction of the information processing apparatus 1 and the direction of the information processing apparatus 2 match. In this case, the coupling permitting unit 11 of the information processing apparatus 1 includes information indicating the direction of the information processing apparatus 1 (a relation to the azimuth orientation of the information processing apparatus 1) which is detected by the azimuth orientation sensor 110 in coupling permission information.

The coupling unit 21 of the information processing apparatus 2 compares the directions of the information processing apparatus 1 and 2 based on the direction of the information processing apparatus 2 (a relation to the azimuth orientation of the information processing apparatus 2) which is detected by an azimuth orientation sensor 210 of the information processing apparatus 2 and the information indicating the direction of the information processing apparatus 1 which is included in the coupling permission information, and performs coupling when the directions match. With the direction of the information processing apparatus 1 and the direction of the information processing apparatus 2 matched, the information processing apparatus 1 and the information processing apparatus 2 come into contact with each other along sides that have the same length.

Figure 6:
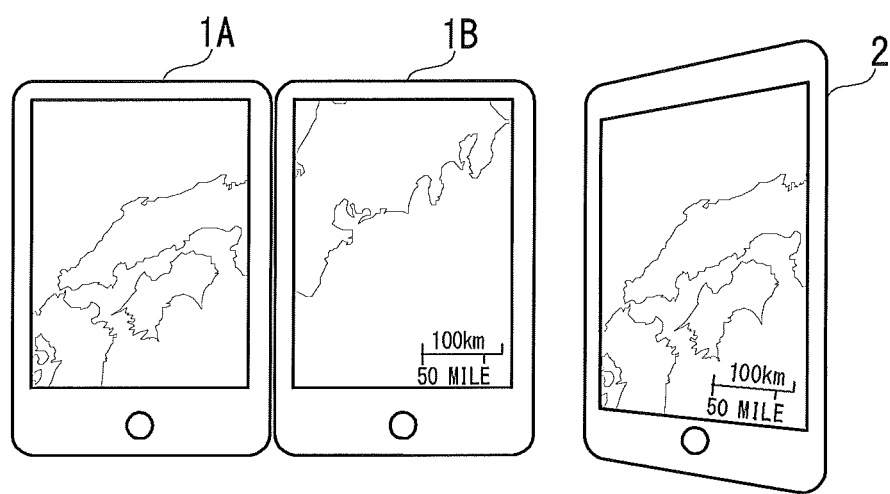
FIG. 6 is a diagram exemplifying how a third information processing apparatus is coupled.

In the case where a third information processing apparatus is coupled, coupling another information processing apparatus to a side along which apparatus have already been coupled is restricted. For instance, when two information processing apparatus 1A and 1B are coupled as illustrated in FIG. 6, coupling the information processing apparatus 2 to the right side of the information processing apparatus 1A and the left side of the information processing apparatus 1B is restricted. In other words, when one information processing apparatus is coupled with a plurality of other apparatuses, a site of the one information processing apparatus that has been identified as a site adjacent to the first other information processing apparatus is not identified as a site of the one information processing apparatus that is adjacent to the second other information processing apparatus. Information about a side along which information processing apparatus are already coupled is included in the coupling permission information as well.

Figure 3C:
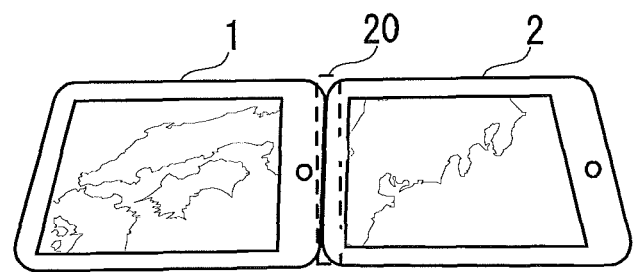

After the coupling processing is finished, the information processing apparatus 2 detects that the information processing apparatus 2 has been laid still horizontally in contact with the information processing apparatus 1 as illustrated in FIG. 3C, and identifies coupled sides 20 along which the information processing apparatus 1 and the information processing apparatus 2 are coupled by analyzing the posture change information and the size information that is stored in the RAM 203. The information processing apparatus 2 uses the screen configuration changing unit 24 to determine the screen configurations of the information processing apparatus 1 and the information processing apparatus 2 depending on which sides are the coupled sides 20 (S104). After determining the screen configurations, the information processing apparatus 2 uses the screen configuration notifying unit 25 to notify the information processing apparatus 1 of screen change information that reflects the determined screen configuration (S105). The information processing apparatus 1 uses the screen configuring unit 12 to receive the screen change information and to change its screen display (S106 and S107). The information processing apparatus 2, too, changes its screen display so that the screen has the determined screen configuration (S108).

Figure 7A:
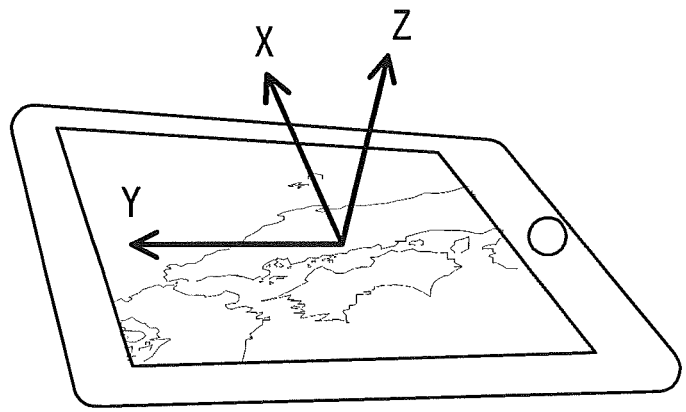
FIGS. 7A and 7B are diagrams illustrating coordinate systems for expressing directions of two information processing apparatus.

The coupled sides 20 can be identified in Step S104 from a change in acceleration before the information processing apparatus 2 is laid still which is detected by the acceleration sensor 208. This is described with a coordinate system set as illustrated in FIG. 7A.

Figure 8A:
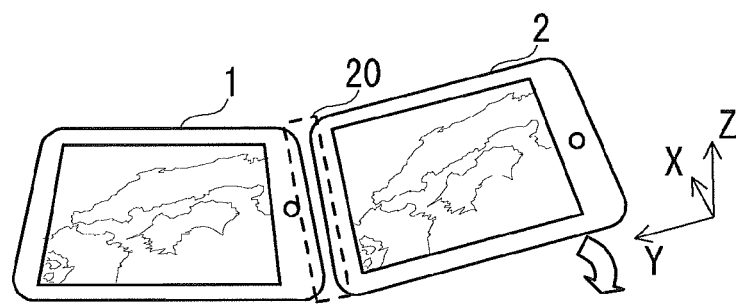
FIG. 8A is a diagram illustrating the moving direction of the information processing apparatus 2.
Figure 8B:
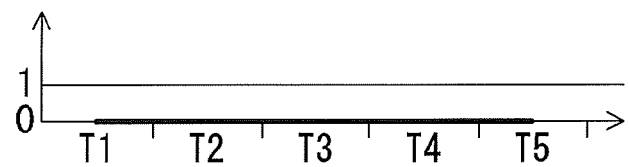
FIG. 8B is a diagram illustrating changes in acceleration during the move.
Figure 8B:
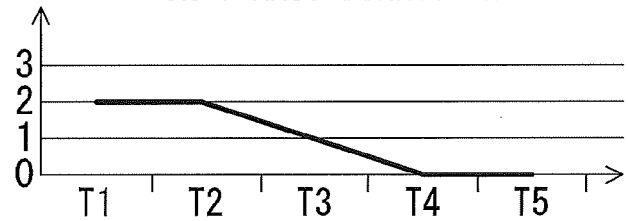
Figure 8B:
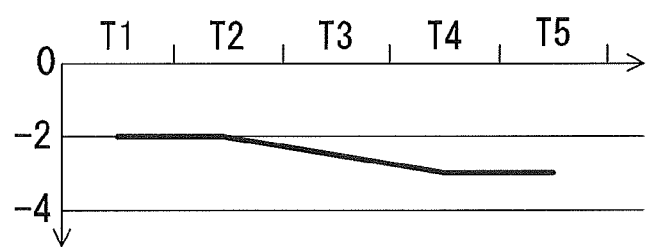

In FIG. 8A, the information processing apparatus 2 is brought close to the information processing apparatus 1 in the negative-to-positive direction of the Y-axis. The acceleration before the information processing apparatus 2 is laid still (prior to T4) in this case does not change in the X-axis direction, and has a negative gradient in the Y-axis and Z-axis directions as illustrated in FIG. 8B. This trend of the acceleration tells that the tilt of the information processing apparatus 2 with respect to the information processing apparatus 1 has changed upon contact and that the information processing apparatus 2 has been laid still horizontally after the contact. The coupled sides 20 are therefore identified as a side of the information processing apparatus 1 that intersects the negative direction of the Y-axis and a side of the information processing apparatus 2 that intersects the positive direction of the Y-axis.

Figure 9A:
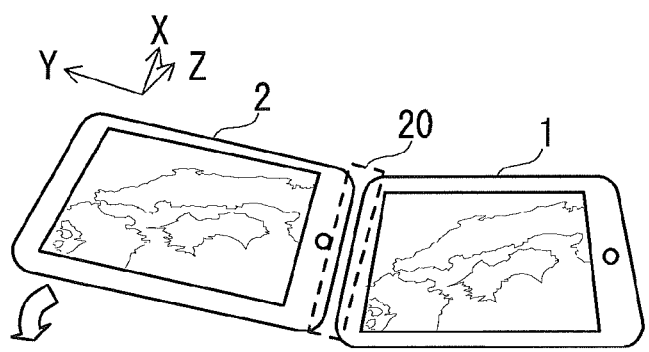
FIG. 9A is a diagram illustrating the moving direction of the information processing apparatus 2.
Figure 9B:
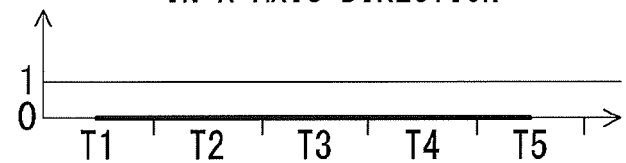
FIG. 9B is a diagram illustrating changes in acceleration during the move.
Figure 9B:
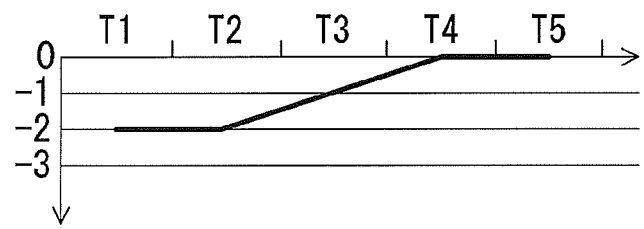
Figure 9B:
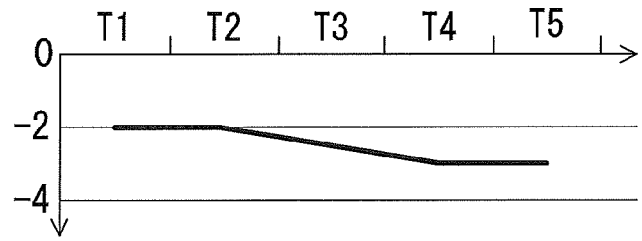

In FIG. 9A, the information processing apparatus 2 is brought close to the information processing apparatus 1 in the positive-to-negative direction of the Y-axis. The acceleration before the information processing apparatus 2 is laid still (prior to T4) in this case does not change in the X-axis direction, has a positive gradient in the Y-axis direction, and has a negative gradient in the Z-axis direction as illustrated in FIG. 9B. This trend of the acceleration tells that the tilt of the information processing apparatus 2 with respect to the information processing apparatus 1 has changed upon contact and that the information processing apparatus 2 has been laid still horizontally after the contact. The coupled sides 20 are therefore identified as a side of the information processing apparatus 1 that intersects the positive direction of the Y-axis and a side of the information processing apparatus 2 that intersects the negative direction of the Y-axis.

Figure 10A:
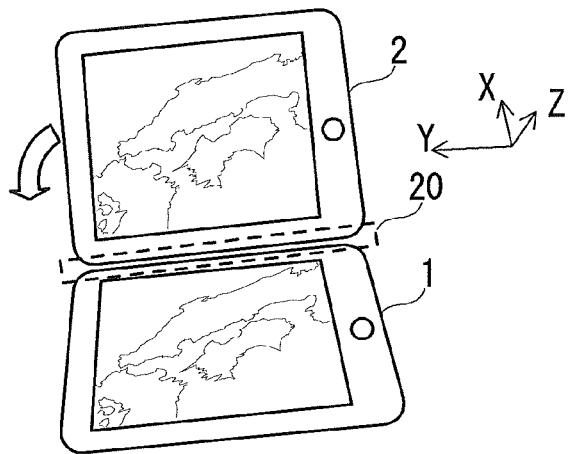
FIG. 10A is a diagram illustrating the moving direction of the information processing apparatus 2.
Figure 10B:
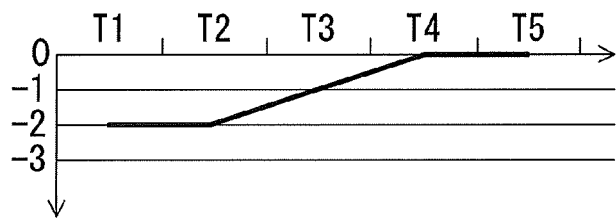
FIG. 10B is a diagram illustrating changes in acceleration during the move.
Figure 10B:
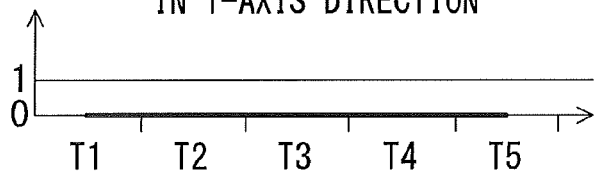
Figure 10B:
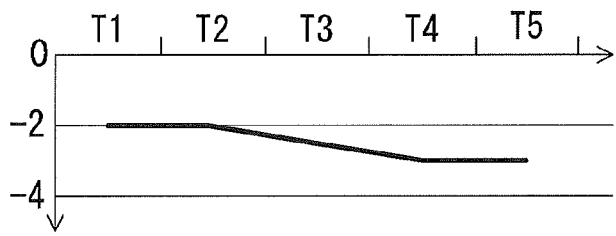

In FIG. 10A, the information processing apparatus 2 is brought close to the information processing apparatus 1 in the positive-to-negative direction of the X-axis. The acceleration before the information processing apparatus 2 is laid still (prior to T4) in this case has a positive gradient in the X-axis direction, does not change in the Y-axis direction, and has a negative gradient in the Z-axis direction as illustrated in FIG. 10B. This trend of the acceleration tells that the tilt of the information processing apparatus 2 with respect to the information processing apparatus 1 has changed upon contact and that the information processing apparatus 2 has been laid still horizontally after the contact. The coupled sides 20 are therefore identified as a side of the information processing apparatus 1 that intersects the positive direction of the X-axis and a side of the information processing apparatus 2 that intersects the negative direction of the X-axis.

Figure 11A:
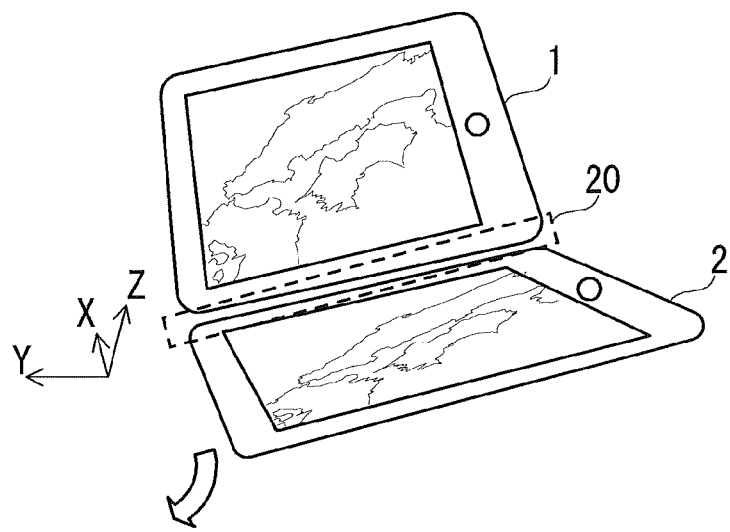
FIG. 11A is a diagram illustrating the moving direction of the information processing apparatus 2.
Figure 11B:
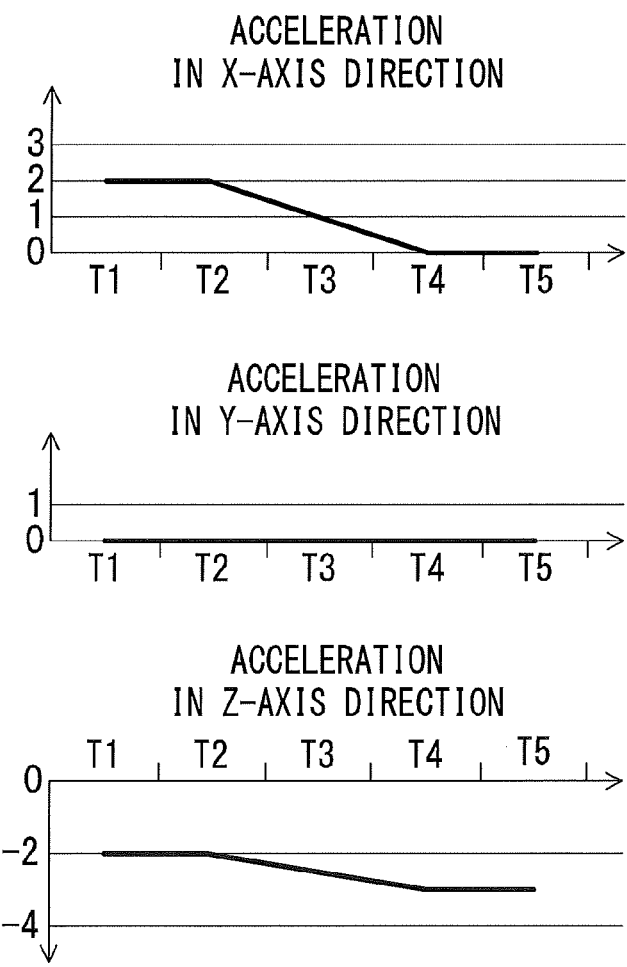
FIG. 11B is a diagram illustrating changes in acceleration during the move.

In FIG. 11A, the information processing apparatus 2 is brought close to the information processing apparatus 1 in the negative-to-positive direction of the X-axis. The acceleration before the information processing apparatus 2 is laid still (prior to T4) in this case has a negative gradient in the X-axis direction, does not change in the Y-axis, and has a negative gradient in the Z-axis direction as illustrated in FIG. 11B. This trend of the acceleration tells that the tilt of the information processing apparatus 2 with respect to the information processing apparatus 1 has changed upon contact and that the information processing apparatus 2 has been laid still horizontally after the contact. The coupled sides 20 are therefore identified as a side of the information processing apparatus 1 that intersects the negative direction of the X-axis and a side of the information processing apparatus 2 that intersects the positive direction of the X-axis.

The coupled side identifying unit 23 of the information processing apparatus 2 thus identifies, as the coupled side 20 of the information processing apparatus 2, out of two sides vertical to a coordinate axis where the acceleration has changed, a side that intersects one of the positive direction of this coordinate axis and the negative direction of this coordinate axis that is opposite to the positive sign/negative sign of the gradient of the acceleration before the information processing apparatus 2 is laid still.

A change in acceleration in the Z-axis is a change that is caused by laying the information processing apparatus 2 still horizontally, and is therefore not considered in the identification of the coupled sides 20.

Figure 7B:
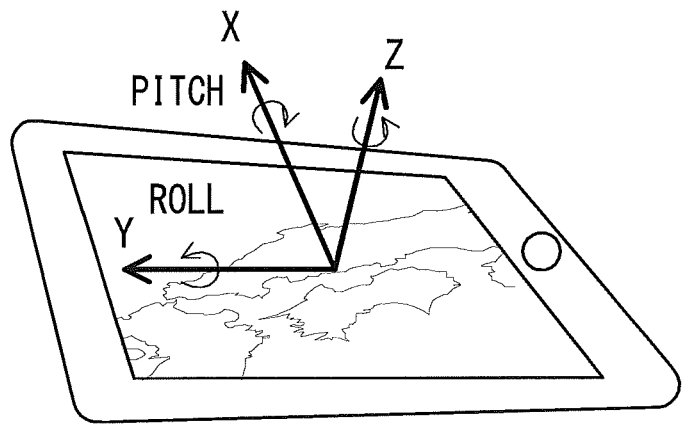

Other than a change in acceleration, the angular velocity of a pitch angle (about the X-axis) or a roll angle (about the Y-axis) which is detected by the angular velocity sensor 209 can also be used to identify the coupled sides 20. This is described with a coordinate system set as illustrated in FIG. 7B.

Figure 12A:
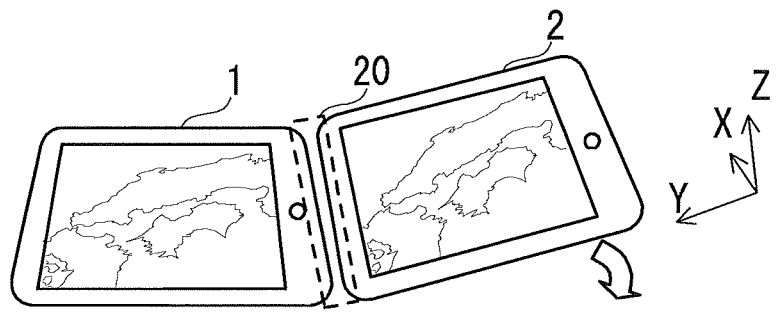
FIG. 12A is a diagram illustrating the moving direction of the information processing apparatus 2.
Figure 12B:
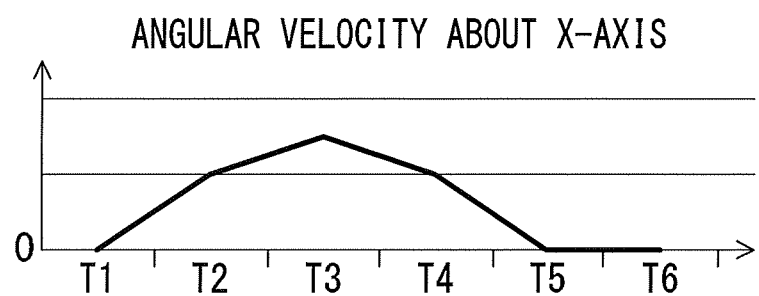
FIG. 12B is a diagram illustrating changes in angular velocity during the move.
Figure 12B:
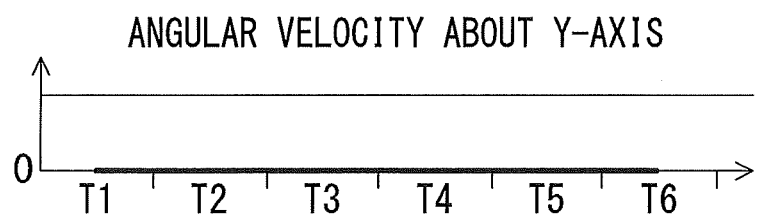
Figure 12B:
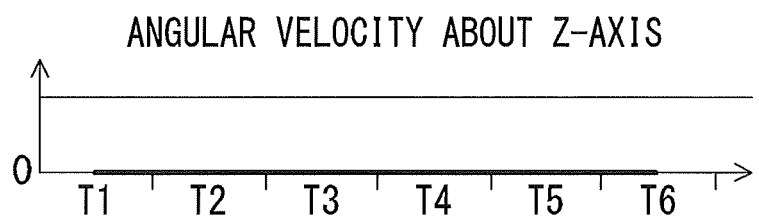

In FIG. 12A, the information processing apparatus 2 is brought close to the information processing apparatus 1 in the negative-to-positive direction of the Y-axis. The angular velocity before the information processing apparatus 2 is laid still (prior to T5) in this case changes about the X-axis in the positive value range, and does not change about the Y-axis and Z-axis as illustrated in FIG. 12B. This trend of the angular velocity tells that the information processing apparatus 2 has been rotated about the X-axis in the positive direction with the coupled side 20 at the center to be laid still horizontally. The coupled sides 20 are therefore identified as a side of the information processing apparatus 1 that intersects the negative direction of the Y-axis and aside of the information processing apparatus 2 that intersects the positive direction of the Y-axis.

Figure 13A:
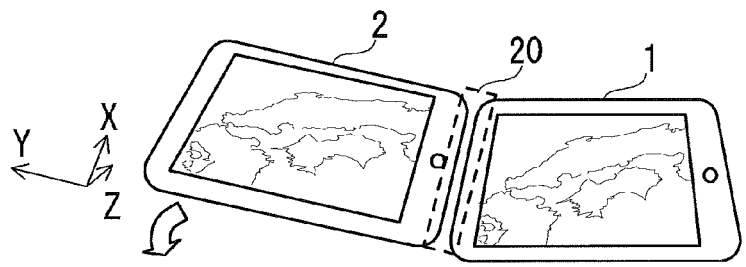
FIG. 13A is a diagram illustrating the moving direction of the information processing apparatus 2.
Figure 13B:
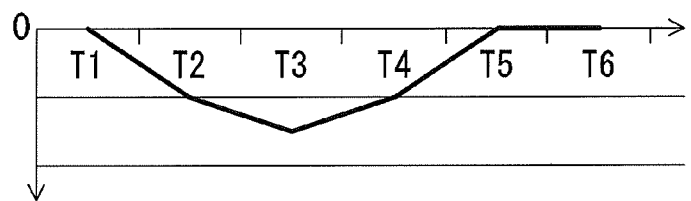
FIG. 13B is a diagram illustrating changes in angular velocity during the move.
Figure 13B:
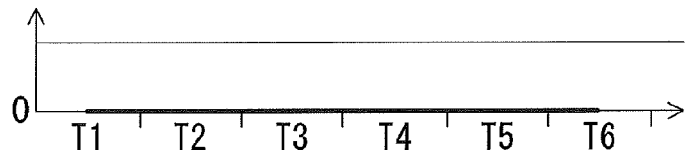
Figure 13B:
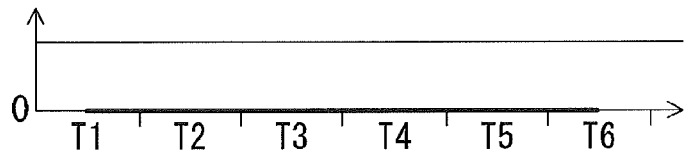

In FIG. 13A, the information processing apparatus 2 is brought close to the information processing apparatus 1 in the positive-to-negative direction of the Y-axis. The angular velocity before the information processing apparatus 2 is laid still (prior to T5) in this case changes about the X-axis in the negative value range, and does not change about the Y-axis and Z-axis as illustrated in FIG. 13B. This trend of the angular velocity tells that the information processing apparatus 2 has been rotated about the X-axis in the negative direction with the coupled side 20 at the center to be laid still horizontally. The coupled sides 20 are therefore identified as a side of the information processing apparatus 1 that intersects the positive direction of the Y-axis and aside of the information processing apparatus 2 that intersects the negative direction of the Y-axis.

Figure 14A:
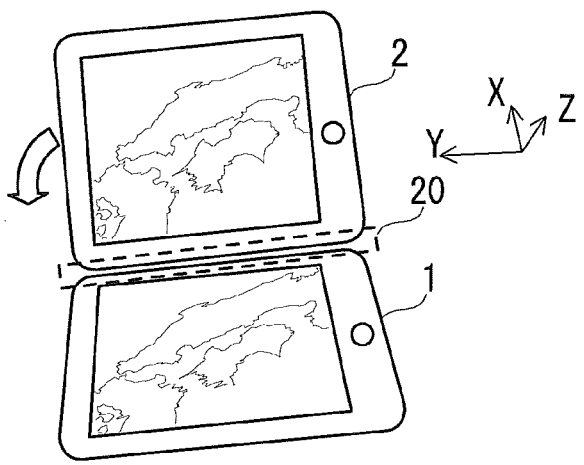
FIG. 14A is a diagram illustrating the moving direction of the information processing apparatus 2.
Figure 14B:
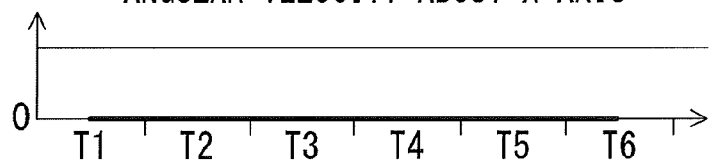
FIG. 14B is a diagram illustrating changes in angular velocity during the move.
Figure 14B:
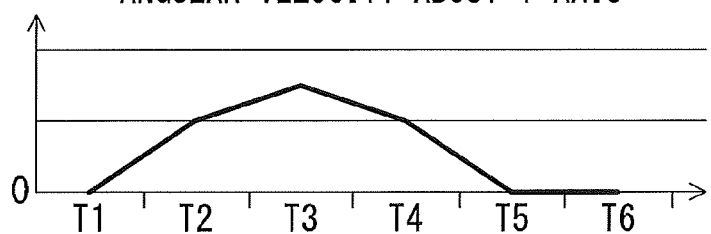
Figure 14B:
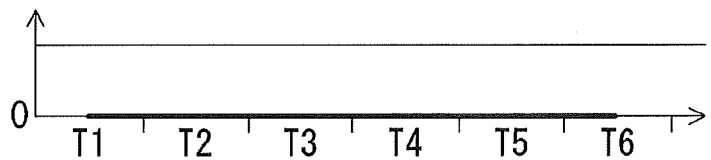

In FIG. 14A, the information processing apparatus 2 is brought close to the information processing apparatus 1 in the positive-to-negative direction of the X-axis. The angular velocity before the information processing apparatus 2 is laid still (prior to T5) in this case changes about the Y-axis in the positive value range, and does not change about the X-axis and Z-axis as illustrated in FIG. 14B. This trend of the angular velocity tells that the information processing apparatus 2 has been rotated about the Y-axis in the positive direction with the coupled side 20 at the center to be laid still horizontally. The coupled sides 20 are therefore identified as a side of the information processing apparatus 1 that intersects the positive direction of the X-axis and aside of the information processing apparatus 2 that intersects the negative direction of the X-axis.

Figure 15A:
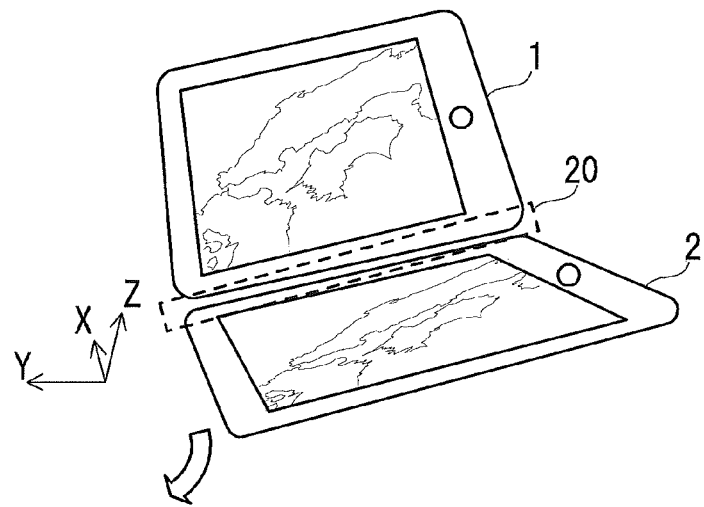
FIG. 15A is a diagram illustrating the moving direction of the information processing apparatus 2.
Figure 15B:
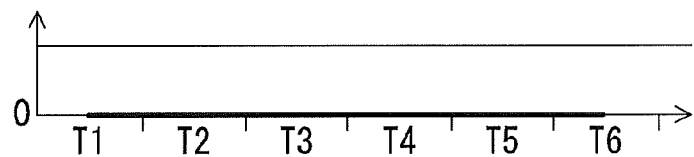
FIG. 15B is a diagram illustrating changes in angular velocity during the move.
Figure 15B:
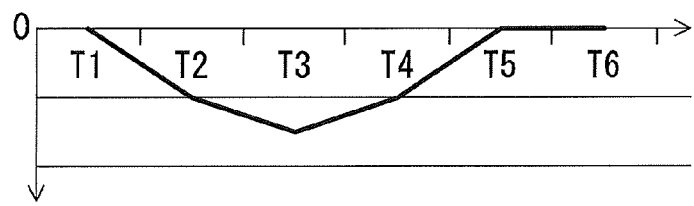
Figure 15B:
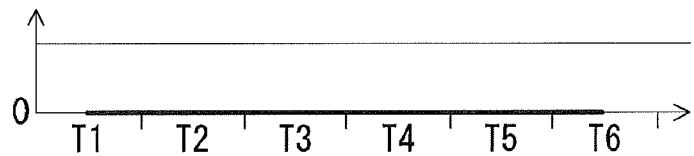

In FIG. 15A, the information processing apparatus 2 is brought close to the information processing apparatus 1 in the negative-to-positive direction of the X-axis. The angular velocity before the information processing apparatus 2 is laid still (prior to T5) in this case changes about the Y-axis in the negative value range, and does not change about the X-axis and Z-axis as illustrated in FIG. 15B. This trend of the angular velocity tells that the information processing apparatus 2 has been rotated about the Y-axis in the negative direction with the coupled side 20 at the center to be laid still horizontally. The coupled sides 20 are therefore identified as a side of the information processing apparatus 1 that intersects the negative direction of the X-axis and aside of the information processing apparatus 2 that intersects the positive direction of the X-axis.

The coupled side identifying unit 23 thus identifies, as the coupled side 20 of the information processing apparatus 2, out of two sides parallel to a coordinate axis where the angular velocity has changed (for example, the X-axis), a side that intersects one of the positive direction of a coordinate axis (the Y-axis) vertical to this coordinate axis and the negative direction of a coordinate axis (the Y-axis) vertical to this coordinate axis that is the same as the positive sign/negative sign of the angular velocity before the information processing apparatus 2 is laid still.

This embodiment has described an example of a case where the information processing apparatus 2 is coupled to the information processing apparatus 1 by bringing the former close to the latter while tilting the information processing apparatus 2 with respect to the display surface of the information processing apparatus 1 as illustrated in FIGS. 3A to 3C. The information processing apparatus 2 may also be coupled to the information processing apparatus 1 by sliding the former on the same plane as the latter, instead of tilting the information processing apparatus 2 with respect to the display surface of the information processing apparatus 1. The information processing apparatus 2 in this case is brought into contact with the information processing apparatus 1, or is halted immediately before contact. A change in acceleration due to the contact or the halt can be used to identify the coupled sides 20. This is described with a coordinate system set as illustrated in FIG. 7A.

Figure 16A:
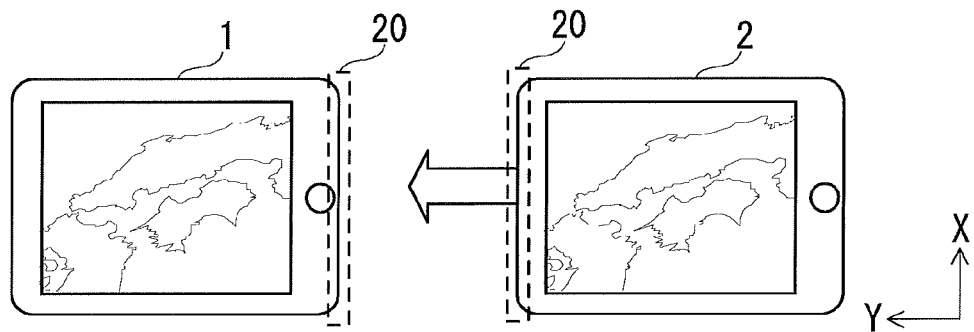
FIG. 16A is a diagram illustrating the moving direction of the information processing apparatus 2.
Figure 16B:
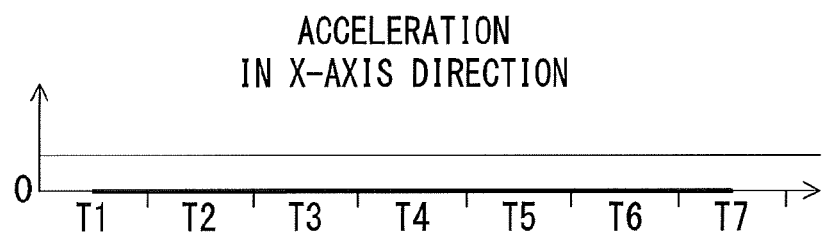
FIG. 16B is a diagram illustrating changes in acceleration during the move.
Figure 16B:
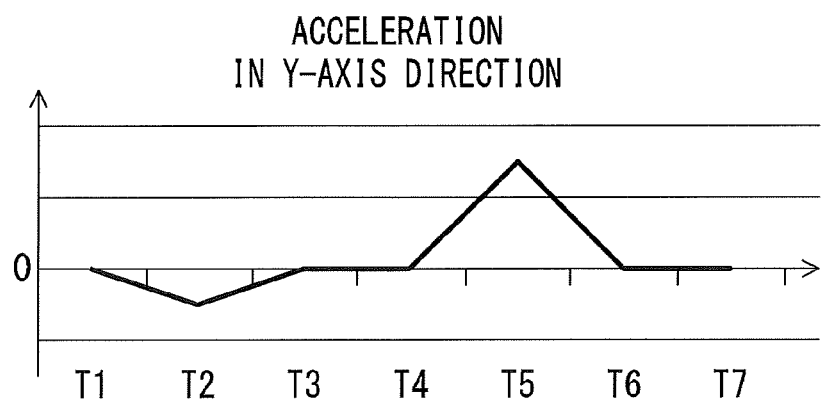
Figure 16B:
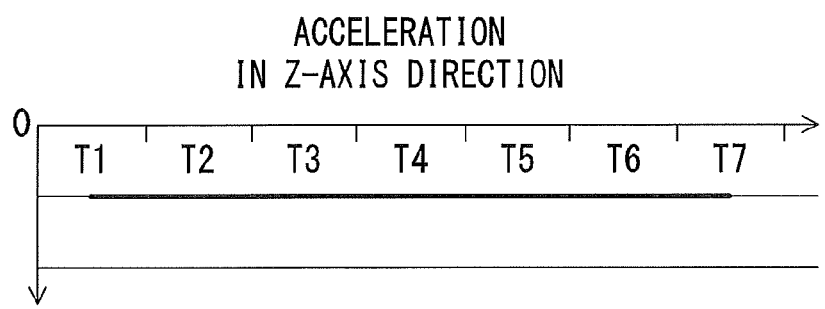

In FIG. 16A, the information processing apparatus 2 is brought close to the information processing apparatus 1 in the negative-to-positive direction of the Y-axis. The acceleration before the information processing apparatus 2 is laid still (prior to T6) in this case does not change in the X-axis direction and the Z-axis direction, and has a negative gradient in the Y-axis direction as illustrated in FIG. 16B. This trend of the acceleration tells that the information processing apparatus 2 has moved in the positive direction of the Y-axis while dropping speed till contact and has been laid still after the contact. The coupled sides 20 are therefore identified as a side of the information processing apparatus 1 that intersects the negative direction of the Y-axis and aside of the information processing apparatus 2 that intersects the positive direction of the Y-axis.

Figure 17A:
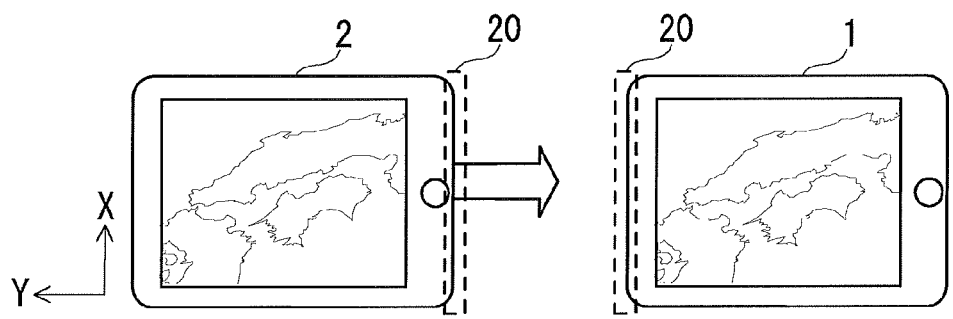
FIG. 17A is a diagram illustrating the moving direction of the information processing apparatus 2.
Figure 17B:
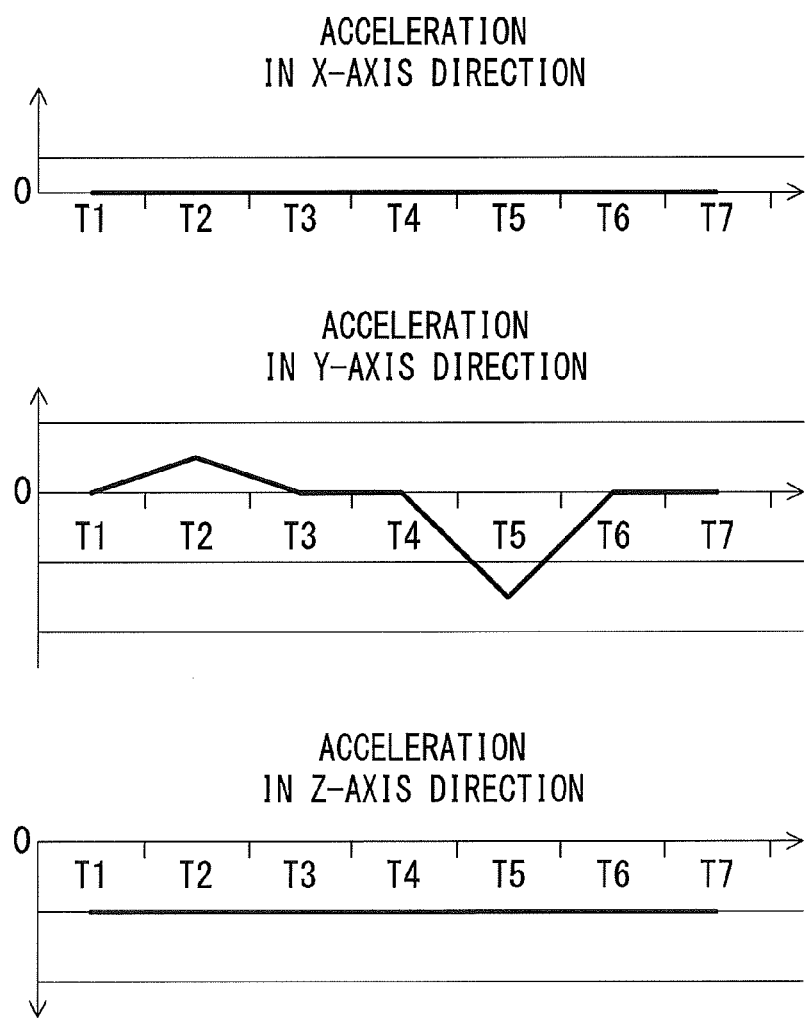
FIG. 17B is a diagram illustrating changes in acceleration during the move.

In FIG. 17A, the information processing apparatus 2 is brought close to the information processing apparatus 1 in the positive-to-negative direction of the Y-axis. The acceleration before the information processing apparatus 2 is laid still (prior to T6) in this case does not change in the X-axis direction and the Z-axis direction, and has a positive gradient in the Y-axis direction as illustrated in FIG. 17B. This trend of the acceleration tells that the information processing apparatus 2 has moved in the negative direction of the Y-axis while dropping speed till contact and has been laid still after the contact. The coupled sides 20 are therefore identified as a side of the information processing apparatus 1 that intersects the positive direction of the Y-axis and aside of the information processing apparatus 2 that intersects the negative direction of the Y-axis.

Figure 18A:
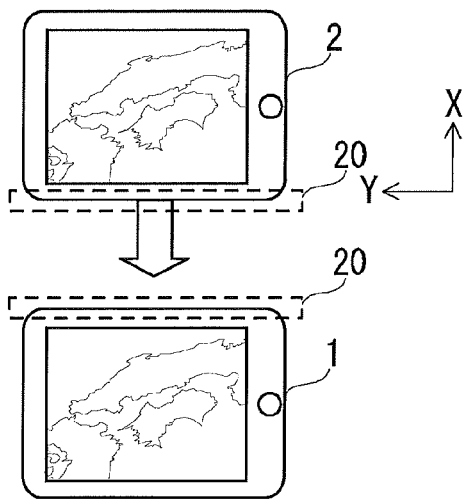
FIG. 18A is a diagram illustrating the moving direction of the information processing apparatus 2.
Figure 18B:
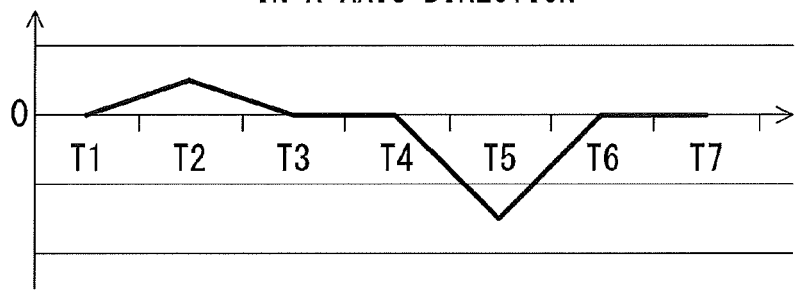
FIG. 18B is a diagram illustrating changes in acceleration during the move.
Figure 18B:
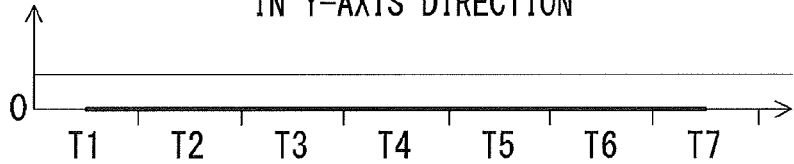
Figure 18B:
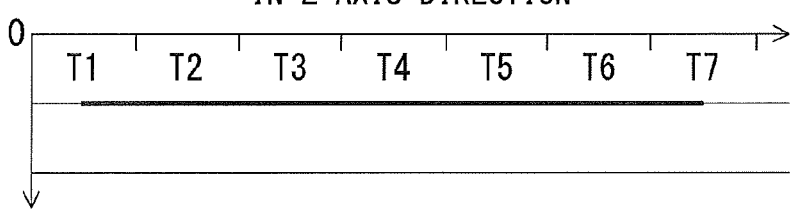

In FIG. 18A, the information processing apparatus 2 is brought close to the information processing apparatus 1 in the positive-to-negative direction of the X-axis. The acceleration before the information processing apparatus 2 is laid still (prior to T6) in this case does not change in the Y-axis direction and the Z-axis direction, and has a positive gradient in the X-axis direction as illustrated in FIG. 18B. This trend of the acceleration tells that the information processing apparatus 2 has moved in the negative direction of the X-axis while dropping speed till contact and has been laid still after the contact. The coupled sides 20 are therefore identified as a side of the information processing apparatus 1 that intersects the positive direction of the X-axis and aside of the information processing apparatus 2 that intersects the negative direction of the X-axis.

Figure 19A:
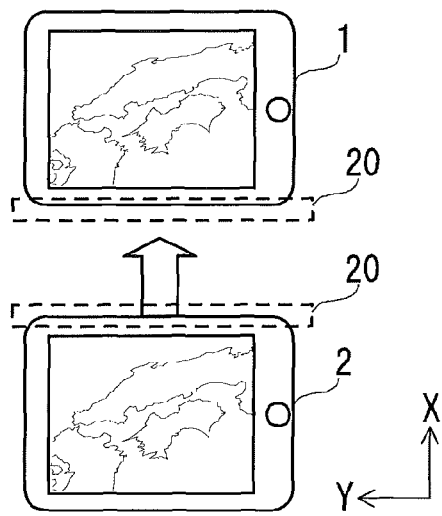
FIG. 19A is a diagram illustrating the moving direction of the information processing apparatus 2.
Figure 19B:
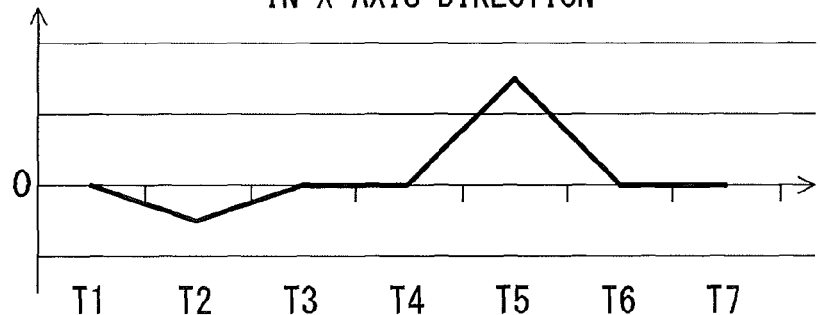
FIG. 19B is a diagram illustrating changes in acceleration during the move.
Figure 19B:
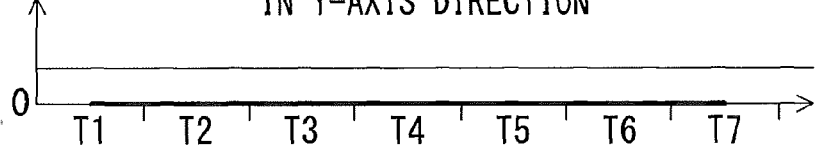
Figure 19B:
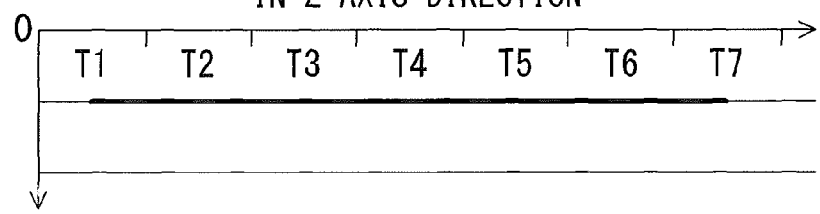

In FIG. 19A, the information processing apparatus 2 is brought close to the information processing apparatus 1 in the negative-to-positive direction of the X-axis. The acceleration before the information processing apparatus 2 is laid still (prior to T6) in this case does not change in the Y-axis direction and the Z-axis direction, and has a negative gradient in the X-axis direction as illustrated in FIG. 19B. This trend of the acceleration tells that the information processing apparatus 2 has moved in the positive direction of the X-axis while dropping speed till contact and has been laid still after the contact. The coupled sides 20 are therefore identified as a side of the information processing apparatus 1 that intersects the negative direction of the X-axis and aside of the information processing apparatus 2 that intersects the positive direction of the X-axis.

The coupled side identifying unit 23 of the information processing apparatus 2 is thus capable of identifying, as the coupled side 20 of the information processing apparatus 2, out of two sides vertical to a coordinate axis where the acceleration has changed, a side that intersects one of the positive direction of this coordinate axis and the negative direction of this coordinate axis that is opposite to the sign of the gradient of the acceleration before the information processing apparatus 2 is laid still. In short, the coupled side identifying unit 23 identifies a side that intersects the moving direction of the information processing apparatus 2 as the coupled side 20.

Figure 20:
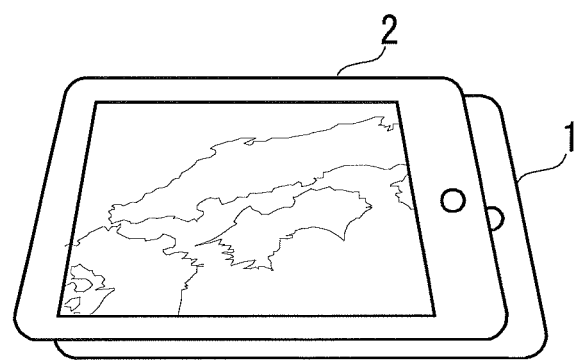
FIG. 20 is an explanatory diagram of positions that two information processing apparatus are in when coupling permission information is notified.

While the information processing apparatus 1 puts out coupling permission information when the permission button 10 is operated in Step S101, the information processing apparatus 1 may put out coupling permission information when overlaid with the information processing apparatus 2 as illustrated in FIG. 20. The information processing apparatus 1 in this case uses the coupling permitting unit 11 and, for example, one of the short-distance wireless communication instruments, to notify the information processing apparatus 2. The short-distance wireless communication instrument notifies coupling permission information at the time when the proximity sensor 114 detects the information processing apparatus 2, for example. The coupling unit 21 of the information processing apparatus 2 performs the coupling processing based on the coupling permission information received from the short-distance wireless communication instrument. Thereafter, the coupled sides 20 are identified and the screens are displayed by executing Step S102 and Steps S104 to S108.

An example of screen transition that is caused by the coupling processing described above on the display unit of the information processing apparatus 1 and the display unit of the information processing apparatus 2 is described with reference to FIGS. 21A and 21B.

Figure 21A:
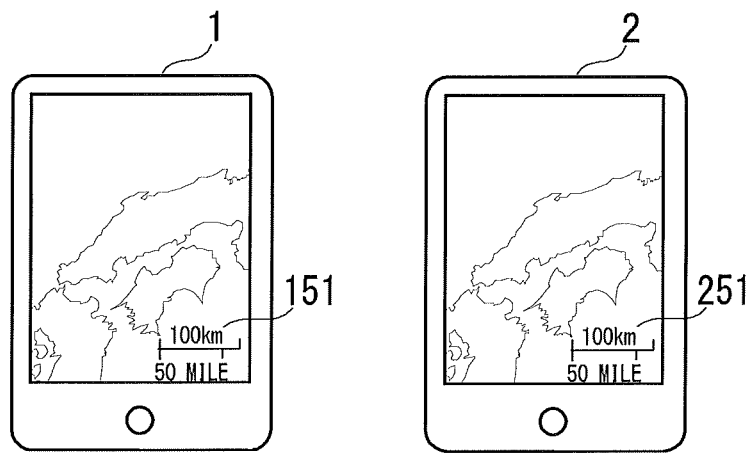
FIGS. 21A and 21B are diagrams exemplifying display screens of two information processing apparatus prior to coupling and after coupling, respectively.
Figure 21B:
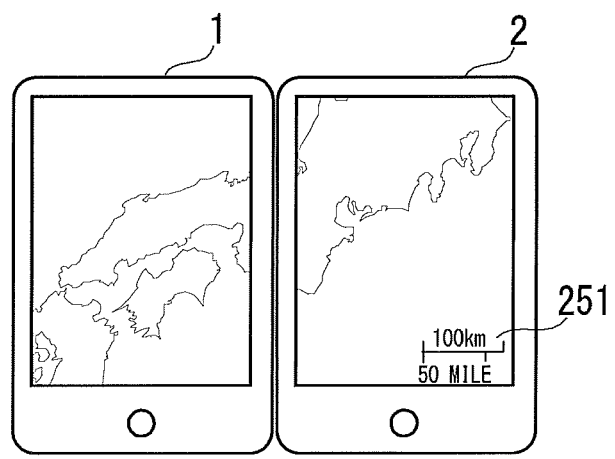

FIG. 21A is a diagram exemplifying screens on the respective display units of the information processing apparatus 1 and the information processing apparatus 2 before coupling. The information processing apparatus 1 and the information processing apparatus 2 display maps of western Japan along with a reduced scale of 151 and a reduced scale of 251, respectively. After coupling, the information processing apparatus 2 displays a map of eastern Japan that connects to the map of western Japan on the information processing apparatus 1, and the reduced scale 151 disappears from the display screen of the information processing apparatus 1 as illustrated in FIG. 21B.

Because the coupled sides 20 are recognized correctly, pieces of one image can correctly be displayed by two information processing apparatus in a distributed manner.

The embodiment described above has discussed an example in which each information processing apparatus has a whole image keeping area for keeping a whole image, pieces of which are displayed on the display units of the information processing apparatus 1 and 2 in a distributed manner. The whole image keeping area may instead be located in an external device that is connected to the information processing apparatus 1 and 2 via a wired or wireless communication unit. For instance, the processing of this embodiment may be applied to a map image managed by a cloud system so that a map of a wide area is displayed by using a plurality of information processing apparatuses as though the apparatus are one information processing apparatus.

Second Embodiment

In a second embodiment, the identification of the coupled sides 20, the changing of the screen configuration, and other types of processing that are performed by the movable information processing apparatus 2 in the first embodiment are handled by a stationary information processing apparatus 4. An information processing apparatus 5 in this case only needs to transmit to the information processing apparatus 4 posture change information that is generated by simple sensing processing of acceleration or the like. The information processing apparatus 5 can therefore be an earlier-generation tablet PC which has poorer processing performance.

Figure 22:
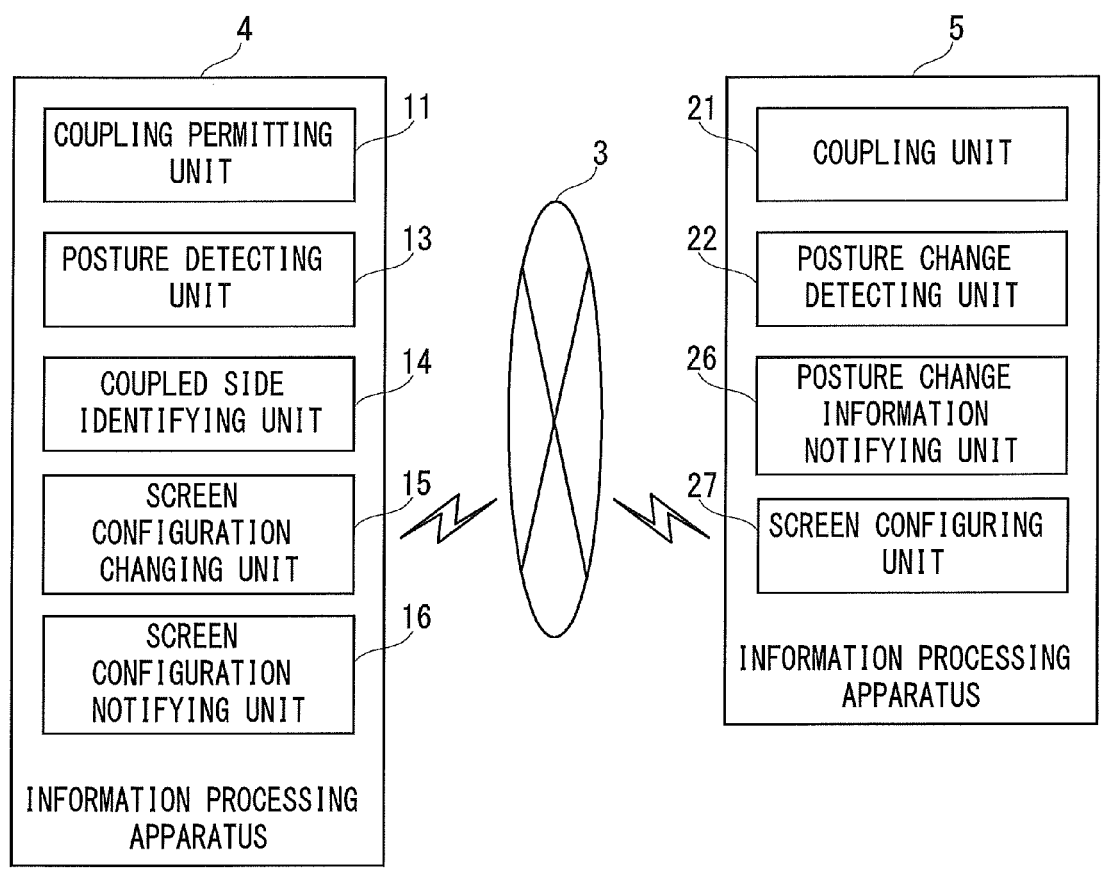
FIG. 22 is an overall configuration diagram of an image display system according to a second embodiment.

FIG. 22 is an overall configuration diagram of an image display system according to the second embodiment.

The information processing apparatus 4 includes a coupled side identifying unit 14, a screen configuration changing unit 15, and a screen configuration notifying unit 16 which respectively correspond to the coupled side identifying unit 23, screen configuration changing unit 24, and screen configuration notifying unit 25 included in the information processing apparatus 2 of the first embodiment. In addition to these, the information processing apparatus 4 has a posture detecting unit 13 for receiving posture change information from the information processing apparatus 5.

The information processing apparatus 5 includes, in addition to the coupling unit 21 and the posture change detecting unit 22, a posture change information notifying unit 26 for notifying the information processing apparatus 4 of posture change information and a screen configuring unit 27, which corresponds to the screen configuring unit 12 included in the information processing apparatus 1 of the first embodiment.

Coupling processing that is executed by the coupling unit 21 of the information processing apparatus 5 is the same as the one in the first embodiment. The information processing apparatus 5 uses the posture change information notifying unit 26 to notify the information processing apparatus 4 of posture change information generated by the posture change detecting unit 22 via an interface that has received the coupling permission information. The posture change information includes size information which indicates the shape and size of a display unit of the information processing apparatus 5. The information processing apparatus 4 uses the posture detecting unit 13 to receive the posture change information. The coupled side identifying unit 14 identifies the coupled sides 20 from the received posture change information. Thereafter, the information processing apparatus 4 notifies the information processing apparatus 5 of screen change information indicating the specifics of a screen configuration change suited to the coupled sides 20 with the use of the screen configuration notifying unit 16 and an interface through which the coupling permission information has been transmitted.

The screen configuring unit 27 of the information processing apparatus 5 changes screen display based on the screen change information notified of by the information processing apparatus 4. The information processing apparatus 4, too, changes its screen display so that the screen has the determined screen configuration.

Third Embodiment

Figure 23:
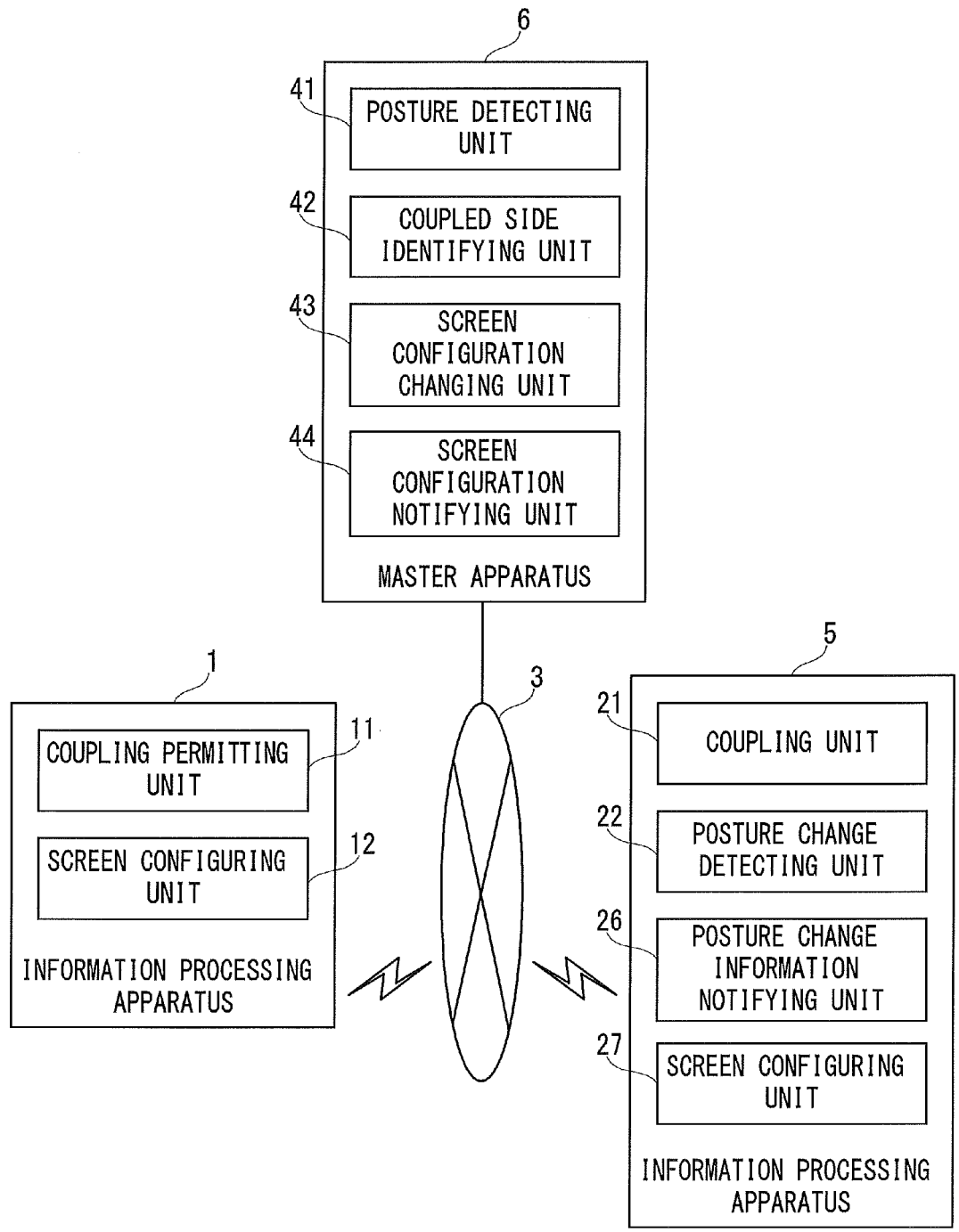
FIG. 23 is an overall configuration diagram of an image display system according to a third embodiment.

An image display system of a third embodiment has a configuration illustrated in FIG. 23, where the information processing apparatus 1 of the first embodiment and the information processing apparatus 5 of the second embodiment are connected in a manner that allows data transmission/reception over the network 3 and a master apparatus 6 is further included in the network 3. With this configuration, the master apparatus 6 handles the identification of the coupled sides 20, the changing of the screen configuration, and other similar types of processing. The information processing apparatus 5 in this case only needs to transmit to the master apparatus 6 posture change information that is generated by simple sensing processing of acceleration or the like. Processing of the information processing apparatus 1, too, is reduced down to the putting out of coupling permission information and the displaying of a screen. The information processing apparatus 1 and the information processing apparatus 5 can therefore be earlier-generation tablet PCs which have poorer processing performance.

Figure 24:
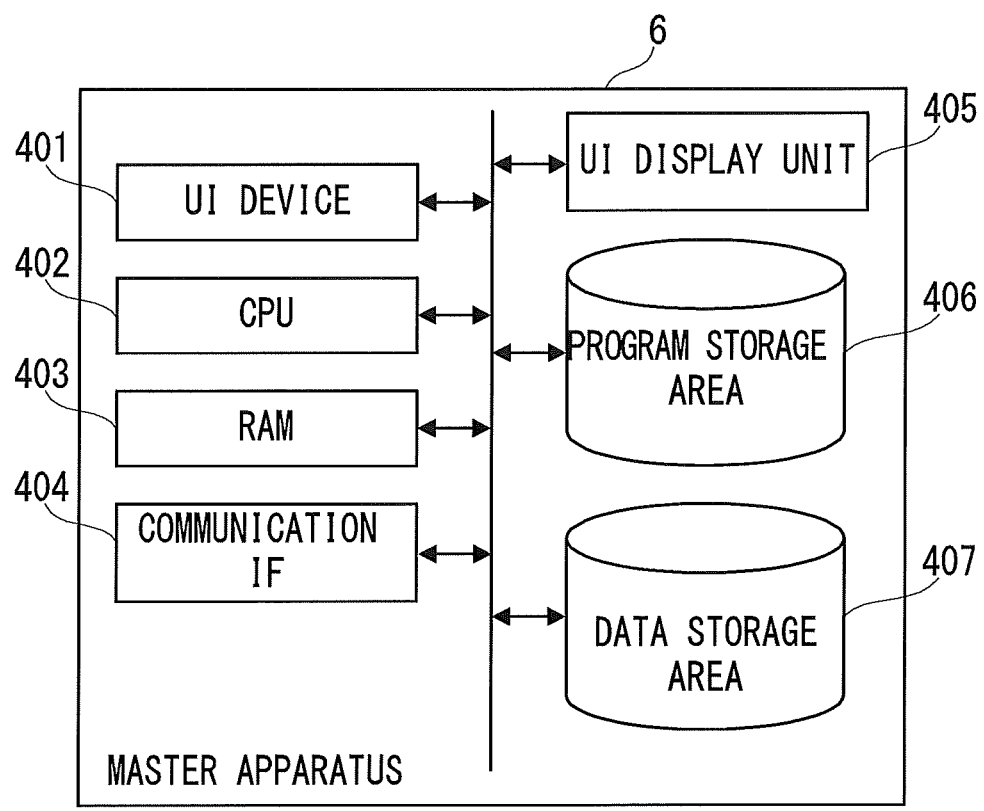
FIG. 24 is a hardware configuration diagram of a master apparatus.

FIG. 24 is a hardware configuration diagram of the master apparatus 6. This master apparatus 6 can be implemented by a general-purpose computer, and may also be implemented by a tablet PC as is the case for the information processing apparatus 1 and the information processing apparatus 5.

A UI device 401 is a mouse, a digitizer, a keyboard, or the like. The UI device 401 enables a user of the master apparatus 6 to input various instructions to the master apparatus 6.

The CPU 402 reads a program out of a program storage area 406 to perform various types of control, calculation, display control, and the like in the master apparatus 6 by executing the program while using a RAM 403 as a work area.

A communication interface 404 is connected to the network 3 to control communication to/from other apparatus such as the information processing apparatus 1 and the information processing apparatus 5.

A UI display unit 405 is a display for displaying the state of the master apparatus 6 and the specifics of processing, such as an LED panel or a liquid crystal panel.

A data storage area 407 stores, among others, data that is used when the CPU 402 executes a program, and contents data such as music data and image data. In this embodiment, in particular, the data storage area 407 keeps a whole image, pieces of which are displayed on the display units of the information processing apparatus 1 and 5 in a distributed manner. The program storage area 406 and the data storage area 407 are implemented by, for example, a large-capacity storage device such as a hard disk or a flash memory.

Through the execution of a program by the CPU 402, a posture detecting unit 41, a coupled side identifying unit 42, a screen configuration changing unit 43, and a screen configuration notifying unit 44 are formed in the master apparatus 6.

The posture detecting unit 41 corresponds to the posture detecting unit 13 which is included in the information processing apparatus 4 of the second embodiment. The coupled side identifying unit 42 corresponds to the coupled side identifying unit 23 which is included in the information processing apparatus 2 of the first embodiment. The screen configuration changing unit 43 corresponds to the screen configuration changing unit 24 which is included in the information processing apparatus 2 of the first embodiment. The screen configuration notifying unit 44 corresponds to the screen configuration notifying unit 25 which is included in the information processing apparatus 2 of the first embodiment.

Coupling processing that is executed by the coupling unit 21 of the information processing apparatus 5 is the same as the one in the first embodiment and the second embodiment. The information processing apparatus 5 uses the posture change information notifying unit 26 to notify the master apparatus 6 of posture change information generated by the posture change detecting unit 22 via the wireless communication interface 204. The posture change information includes size information which indicates the shapes and sizes of the display units of the information processing apparatus 1 and 5. The master apparatus 6 uses the posture detecting unit 41 to receive the posture change information via the communication interface 404. The coupled side identifying unit 42 identifies the coupled sides 20 from the received posture change information. Thereafter, the master apparatus 6 transmits screen change information indicating the specifics of a screen configuration change suited to the coupled sides 20 to the information processing apparatus 1 and the information processing apparatus 5 via the communication interface 404.

The screen configuring unit 12 of the information processing apparatus 1 changes screen display based on the screen change information notified of by the master apparatus 6. Similarly, the screen configuring unit 27 of the information processing apparatus 5 changes screen display based on the screen change information notified of by the master apparatus 6.

As has been described, the coupled sides 20 are identified from behavior during coupling in any of the embodiments. The positions of the information processing apparatus 1 or 4 and the position of the information processing apparatus 2 or 5 in the entire screen can thus be detected precisely. Accordingly, after the information processing apparatus 1 or 4 and the information processing apparatus 2 or 5 are coupled, the entire screen can be displayed correctly with pieces of the entire screen distributed to the respective information processing apparatus.

The present disclosure can provide an image display technology with which a function of displaying a screen by using display units of a plurality of information processing apparatuses is implemented simply.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment (s) of the present disclosure, and by a method performed by the computer of the system or apparatus by, for example, reading out and executing the computer executable instructions from the storage medium to perform the functions of one or more of the above-described embodiment (s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or BLU-RAY Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2012-249284, filed Nov. 13, 2012, which is hereby incorporated by reference herein in its entirety.

What is claimed is:

1. An information processing apparatus for displaying, in cooperation with a display unit of another apparatus adjacent to the information processing apparatus, adjacent partial images out of a plurality of partial images that constitute one image, the information processing apparatus comprising:
   a detection unit configured to detect posture change information about movement of the information processing apparatus;
   an identification unit configured to identify a site of the information processing apparatus that adjoins the another apparatus based on the posture change information about movement which has been detected by the detection unit, wherein, based on transition of the posture change information detected by the detection unit within a period during which the information processing apparatus is proximate to the another apparatus and at a period immediately before the information processing apparatus is stilled, the identification unit is configured to identify a first site as the site of the information processing apparatus that adjoins the another apparatus, the identified first site is a site which is, out of sites of the information processing apparatus, at a vertically lower position when the information processing apparatus is tilted just before the information processing apparatus is stilled;
   a coupling unit configured to couple the information processing apparatus and the another apparatus based on coupling permission information and the transition of the posture change information; and
   a display control unit to cause a display unit of the information processing apparatus to display a partial image that is identified based on the site identified by the identification unit out of the plurality of partial images that constitute the one image,
   wherein the detection unit, the identification unit, the coupling unit, and the display control unit are implemented by at least one processor.

2. The information processing apparatus according to claim 1, further comprising an image management unit configured to notify the another apparatus of, as a partial image to be displayed on the display unit of the another apparatus, a partial image that adjoins in a specific direction the partial image to be displayed on the display unit of the information processing apparatus out of the plurality of partial images that constitute the one image,
   wherein the image management unit is implemented by at least one processor.

3. The information processing apparatus according to claim 1, wherein, as the posture change information about movement of the information processing apparatus, the detection unit is further configured to detect acceleration in three directions including two directions of axises parallel to a display surface of the display unit of the information processing apparatus and one direction crossing the display surface; and based on transition of the acceleration acting in the three directions detected by the detection unit, the identification unit is further configured to identify a first side as the first site, the identified first side is a side which is, out of four sides enclosing the display surface, at a vertically lower position when the information processing apparatus is tilted just before the information processing apparatus is stilled.

4. The information processing apparatus according to claim 1, wherein, as the posture change information about movement of the information processing apparatus, the detection unit detects angular velocity acting on the information processing apparatus is further configured to detect angular velocity acting about three directions including two directions of axises parallel to a display surface of the display unit of the information processing apparatus and one direction crossing the display surface; and based on transition of the angular velocity detected by the detection unit within a period during which the information processing apparatus is proximate to the another apparatus and at a period immediately before the information processing apparatus is stilled, the identification unit is further configured to identify a second side as the first site, the identified second side is a side which is, out of four sides enclosing the display surface, a center of rotation of the information processing apparatus just before the information processing apparatus is stilled.

5. The information processing apparatus according to claim 1, further comprising:

an orientation detecting unit configured to detect information that indicates a relation of the information processing apparatus to an azimuth orientation; and an orientation obtaining unit configured to obtain, from the another apparatus, information that indicates a relation of the another apparatus to an azimuth orientation, wherein the identification unit compares the information that indicates the relation of the information processing apparatus to the azimuth orientation and the information that indicates the relation of the another apparatus to the azimuth orientation and, when a direction in which the information processing apparatus is directed and a direction in which the another apparatus is directed match, identifies a site of the information processing apparatus that adjoins the another apparatus, wherein the orientation detecting unit and the orientation obtaining unit are implemented by at least one processor.

6. The information processing apparatus according to claim 1, wherein the identification unit is further configured to obtain size information which indicates a size of the display unit of the information processing apparatus and a size of the display unit of the another apparatus, and identifies a site of the information processing apparatus that adjoins the another apparatus based on the size information and the posture change information about movement which has been detected by the detection unit.

7. The information processing apparatus according to claim 1, further comprising a reception unit configured to receive the coupling permission information which is put out by another apparatus, wherein the identification unit is further configured to recognize the another apparatus that has put out the coupling permission information received by the reception unit as the another apparatus with which the information processing apparatus cooperates in order to together display the adjacent partial images out of the plurality of partial images that constitute the one image, wherein the reception unit is implemented by at least one processor.

8. The information processing apparatus according to claim 7, wherein, when the reception unit receives the coupling permission information from a plurality of other apparatuses, the identification unit recognizes, as the another apparatus with which the information processing apparatus cooperates in order to together display the adjacent partial images out of the plurality of partial images that constitute the one image, any of the plurality of other apparatus that transmit the coupling permission information at a radio field intensity higher than a given intensity.

9. The information processing apparatus according to claim 1, wherein, when the information processing apparatus cooperates with a plurality of other apparatuses in order to together display the adjacent partial images out of the plurality of partial images that constitute the one image, the identification unit is further configured to identify a site of the information processing apparatus that adjoins a first other apparatus and is inhibited from identifying the identified site as a site of the information processing apparatus that adjoins a second other apparatus.

10. An information processing apparatus for displaying, in cooperation with a display unit of another apparatus adjacent to the information processing apparatus, adjacent partial images out of a plurality of partial images that constitute one image, the information processing apparatus comprising:

an acquisition unit configured to acquire, from the another apparatus, posture change information about movement of the another apparatus;

an identification unit configured to identify a site of the information processing apparatus that adjoins the another apparatus based on the posture change information about movement of the another apparatus acquired by the acquisition unit, wherein, based on transition of the posture change information acquired by the acquisition unit within a period during which the another information processing apparatus is proximate to the information processing apparatus and at a period immediately before the another information processing apparatus is stilled, the identification unit identifies a second site as the site of the information processing apparatus that adjoins the another apparatus, the identified second site is a site which is, out of sites of the information processing apparatus, at a position facing to a site of the another information processing apparatus which is positioned at a vertically lower position when the another information processing apparatus is tilted just before the another information processing apparatus is stilled;

a coupling unit configured to couple the information processing apparatus and the another apparatus based on coupling permission information and the transition of the posture change information; and a display control unit to cause a display unit of the information processing apparatus to display a partial image that is identified based on the site identified by the identification unit out of the plurality of partial images that constitute the one image, wherein the acquisition unit, the identification unit, the coupling unit, and the display control unit are implemented by at least one processor.

11. The information processing apparatus according to claim 10, further comprising an image management unit configured to notify the another apparatus of, as a partial image to be displayed on the display unit of the another apparatus, a partial image that adjoins the partial image to be displayed on the display unit of the information processing apparatus out of the plurality of partial images that constitute the one image,
   wherein the image management unit is implemented by at least one processor.

12. An information processing apparatus for displaying adjacent partial images out of a plurality of partial images that constitute one image on respective display units of a first information processing apparatus and a second information processing apparatus which are adjacent to each other, the information processing apparatus comprising:
   an acquisition unit configured to acquire, from the first information processing apparatus, posture change information about movement of the first information processing apparatus, wherein the posture change information about movement of the first information processing apparatus includes information about acceleration acting on the first information processing apparatus;
   an identification unit configured to identify a site of the first information processing apparatus and a site of the second information processing apparatus that adjoin each other, based on the posture change information about movement of the first information processing apparatus which has been acquired by the acquisition unit, wherein, based on transition of the acceleration which has acted on the first information processing apparatus within a period during which the first information processing apparatus is proximate to the second information apparatus, the identification unit is further configured to identify a third site as the site of the information processing apparatus that adjoins the second information processing apparatus, the third site is a site which is, out of sites of the first information processing apparatus, at a vertically lower position when the information processing apparatus is tilted just before it is stilled, the identification unit is further configured to identify a fourth site as the site of the second information processing apparatus that adjoins the first information processing apparatus, the fourth site is a site which is, out of sites of the second information processing apparatus, at a position facing to the third site;
   a coupling unit configured to couple the first information processing apparatus and the second apparatus based on coupling permission information, the posture change information, and the transition of acceleration; and
   a display control unit to cause the display unit of the first information processing apparatus and the display unit of the second information processing apparatus to display partial images that are identified based on the adjoining sites of the first information processing apparatus and the second information processing apparatus which have been identified by the identification unit out of the plurality of partial images that constitute the one image,
   wherein the acquisition unit, the identification unit, the coupling unit, and the display control unit are implemented by at least one processor.

13. The information processing apparatus according to claim 12, further comprising an image management unit configured to notify the second apparatus of, as the partial image to be displayed on the display unit of the second apparatus, a partial image that adjoins the partial image to be displayed on the display unit of the first information processing apparatus out of the plurality of partial images that constitute the one image,
   wherein the image management unit is implemented by at least one processor.

14. The information processing apparatus according to claim 3, wherein:
   the identification unit is further configured to identify, based on the detected transition, an axis on which a change in acceleration acted within a period during which the information processing apparatus is proximate to the another apparatus and at a period immediately before the information processing apparatus is stilled; and
   the identification unit is further configured to identify, out of four sides enclosing the display surface, one side from the sides which is perpendicular to the identified axis as the first site.

15. The information processing apparatus according to claim 5, wherein:
   the identification unit is further configured to identify, out of four sides enclosing the display surface, a third side as the first site, the third side is a side which corresponds to a vertically lower side out of the sides which are perpendicular to an axis which is identified to be an axis on which a change in acceleration acted.

* * * * *